(12) United States Patent
Saquib et al.

(10) Patent No.: US 11,423,549 B2
(45) Date of Patent: Aug. 23, 2022

(54) INTERACTIVE BODY-DRIVEN GRAPHICS FOR LIVE VIDEO PERFORMANCE

(71) Applicant: Adobe Inc., San Jose, CA (US)

(72) Inventors: Nazmus Saquib, Cambridge, MA (US); Rubaiat Habib Kazi, Seattle, WA (US); Li-Yi Wei, Redwood City, CA (US); Wilmot Li, Seattle, WA (US)

(73) Assignee: Adobe Inc., San Jose, CA (US)

( * ) Notice: Subject to any disclaimer, the term of this patent is extended or adjusted under 35 U.S.C. 154(b) by 209 days.

(21) Appl. No.: 16/683,665

(22) Filed: Nov. 14, 2019

(65) Prior Publication Data
US 2021/0150731 A1    May 20, 2021

(51) Int. Cl.
| | | |
|---|---|---|
| *G06T 7/20* | (2017.01) | |
| *G06T 7/70* | (2017.01) | |
| *G06T 7/62* | (2017.01) | |
| *G06T 19/00* | (2011.01) | |
| *G06F 3/01* | (2006.01) | |
| *G06T 19/20* | (2011.01) | |

(52) U.S. Cl.
CPC ............... *G06T 7/20* (2013.01); *G06F 3/011* (2013.01); *G06F 3/017* (2013.01); *G06T 7/62* (2017.01); *G06T 7/70* (2017.01); *G06T 19/006* (2013.01); *G06T 19/20* (2013.01); *G06T 2207/10016* (2013.01); *G06T 2219/2016* (2013.01)

(58) Field of Classification Search
CPC .... G06T 7/20; G06T 7/62; G06T 7/70; G06T 19/006; G06T 19/20; G06T 2207/10016; G06T 2219/2016; G06F 3/011; G06F 3/017
See application file for complete search history.

(56) References Cited

U.S. PATENT DOCUMENTS

| | | | | |
|---|---|---|---|---|
| 2010/0302138 A1* | 12/2010 | Poot | .................. | G06F 3/011 345/156 |
| 2012/0299912 A1* | 11/2012 | Kapur | .................. | G06F 3/017 345/419 |
| 2014/0035901 A1* | 2/2014 | Chen | .................. | G06T 13/40 345/419 |
| 2016/0078662 A1* | 3/2016 | Herman | .................. | G06T 13/40 345/473 |

(Continued)

OTHER PUBLICATIONS

Matulic, Fabrice, et al. ("Embodied interactions for novel immersive presentational experiences." Proceedings of the 2016 CHI Conference Extended Abstracts on Human Factors in Computing Systems. 2016.) (Year: 2016).*

(Continued)

*Primary Examiner* — Yu Chen
(74) *Attorney, Agent, or Firm* — Kilpatrick Townsend & Stockton LLP

(57) ABSTRACT

This disclosure involves mapping body movements to graphical manipulations for real-time human interaction with graphics. Certain aspects involve importing graphical elements and mapping input actions, such as gestures, to output graphical effects, such as moving, resizing, changing opacity, and/or deforming a graphic, by using nodes of a reference skeleton and edges (e.g., links) between the nodes of the reference skeleton and the pins. The mapping is used to trigger and interact with the graphical elements with body position and/or movement.

20 Claims, 15 Drawing Sheets

(56) References Cited

U.S. PATENT DOCUMENTS

| | | | |
|---|---|---|---|
| 2016/0267699 A1* | 9/2016 | Borke | G06F 3/011 |
| 2016/0307354 A1* | 10/2016 | Baur | G06T 13/40 |
| 2019/0139297 A1* | 5/2019 | Chen | G06T 15/04 |
| 2019/0362529 A1* | 11/2019 | Wedig | G06T 17/20 |

OTHER PUBLICATIONS

Adobe After Effects, Buy Adobe After Effects, Visual Effects and Motion Graphics Software, Available Online at https://www.adobe.com/products/aftereffects.html, Accessed from Internet on: Nov. 18, 2019, pp. 1-10.

Adobe Animate, Buy Adobe Animate, Flash and 2D Animation Software, Available Online at https://www.adobe.com/products/animate.html, Accessed from Internet on: Nov. 18, 2019, pp. 1-9.

Adobe Character Animator, Available Online at https://www.adobe.com/products/character-animator.html, Accessed from Internet on: Nov. 18, 2019, pp. 1-7.

Augmented Reality Kinect Photobooth (First Interactive Photobooth in the Philippines), The Hand Creative Technology, Available Online at: https://www.youtube.com/watch?v=IMoxFXg1gBo, Apr. 8, 2014, pp. 1-3.

Data-Driven Documents, D3.js—Data-Driven Documents, Available Online at https://d3js.org/, Accessed from Internet on: Nov. 18, 2019, pp. 1-4.

Flash with ActionScript 3.0, Actionscript Reference and Documentation, Adobe Developer Connection, Available Online at https://www.adobe.com/devnet/actionscript/documentation.html, Accessed from Internet on: Nov. 18, 2019, pp. 1-2.

Hans Rosling: 200 Years in 4 Minutes, BBC News, Available Online at https://youtu.be/Z8t4k0Q8e8Y, Feb. 8, 2017, pp. 1-3.

How Cartoon Donald Trump Comes to Life on 'the Late Show', CNET, Available Online at https://www.cnet.com/news/cartoon-donald-trump-late-show-stephen-colbert/, Oct. 19, 2016, pp. 1-6.

OpenFrameworks, openFrameworks, C++ toolkit for creative coding, Available Online at https://openframeworks.cc/, Accessed from Internet on: Nov. 18, 2019, pp. 1-3.

Processing, Available Online at https://processing.org/, Accessed from Internet on: Nov. 18, 2019, pp. 1-2.

This is What a Trade War Looks Like, CNN Money, Available Online at https://youtu.be/VA-LdvH35Uk, Apr. 2, 2018, pp. 1-3.

Unity for All, Unity Real-Time Development Platform, 3D, 2D VR & AR Visualizations, Available Online at https://unity3d.com/, Accessed from Internet on: Nov. 18, 2019, pp. 1-10.

Weather Solutions: 4 of Today's Leading Weather Software Systems, NewscastStudio, Available Online at: https://www.newscaststudio.com/2017/06/21/tv-weather-solutions/, Accessed from Internet on Nov. 18, 2019, pp. 1-6.

Aigner et al., Understanding Mid-Air Hand Gestures: A Study of Human Preferences in Usage of Gesture Types for HCI, Microsoft Research Technical Report MSR-TR-2012-111, 2012, pp. 1-10.

Anderson et al., YouMove: Enhancing Movement Training with an Augmented Reality Mirror, In Proceedings of the 26th Annual ACM Symposium on User Interface Software and Technology, Oct. 8-11, 2013, pp. 311-321.

Baudel et al.. Charade: Remote Control of Objects Using Free-Hand Gestures, Special Issue of Communications of the ACM on Computer-Augmented Reality, Jul. 1993, pp. 1-9.

Benko et al., MirageTable: Freehand Interaction on a Projected Augmented Reality Tabletop, In Proceedings of the SIGCHI Conference on Human Factors in Computing Systems, May 5-10, 2012, pp. 199-208.

Blum et al., Mirracle: An Augmented Reality Magic Mirror System for Anatomy Education, In Virtual Reality Short Papers and Posters (VRW), 2012 IEEE, 2012, pp. 115-116.

Buxton et al., Human Input to Computer Systems: Theories, Techniques and Technology, Manuscrito De Livro Em Andamento, Sem Editora, 2002, pp. 1-35.

Cadoz et al., Les Réalités Virtuelles, Flammarion, 1994, 1 page.

Cao et al., Realtime Multi-Person 2D Pose Estimation using Part Affinity Fields, IEEE Conference on Computer Vision and Pattern Recognition (CVPR), vol. Jul. 21-26, 2017, pp. 7291-7299.

Chen et al., KinÊTre: Animating the World with the Human Body, In Proceedings of the 25th Annual ACM Symposium on User Interface Software and Technology (UIST'12). ACM, New York, NY, USA, Oct. 7-10, 2012, pp. 435-443.

Cong, et al., How Does the Xbox Kinect Work, How it Works, Available Online at https://www.jameco.com/jameco/workshop/howitworks/xboxkinect.html, Accessed from Internet on Nov. 19, 2019, 7 pages.

Davis et al., K-Sketch: a 'Kinetic' Sketch Pad for Novice Animators, In Proceedings of the SIGCHI Conference on Human Factors in Computing Systems, ACM, Apr. 5-10, 2008, 10 pages.

Dontcheva et al., Layered Acting for Character Animation, In ACM SIGGRAPH 2003 Papers (SIGGRAPH'03), ACM, vol. 22, No. 3, Available Online at https://doi.org/10.1145/1201775.882285, Jul. 27-31, 2003, pp. 409-416.

Dourish, Where the Action is: The Foundations of Embodied Interaction, MIT Press, 2004. 4 pages.

Efron, Gesture and Environment, King's Crown Press, 1941, 1 page.

Gillian et al., An Adaptive Classification Algorithm for Semiotic Musical Gestures, Citeseer, 2011, 8 pages.

Held et al., 3D Puppetry: A Kinect-Based Interface for 3D Animation, UIST'12 Proceedings of the 25th Annual ACM Symposium on User Interface Software and Technology, Oct. 7-10, 2012, pp. 423-434.

Igarashi et al., As-Rigid-As-Possible Shape Manipulation, ACM Transactions on Computer Graphics, vol. 24, Issue 3, Jul. 2005, pp. 1134-1141.

Kang et al., SharedPhys: Live Physiological Sensing, Whole-Body Interaction, and Large-Screen Visualizations to Support Shared Inquiry Experiences, In Proceedings of the 15th International Conference on Interaction Design and Children. ACM., Jun. 2016, pp. 275-287.

Kazi et al., Draco: Bringing Life to Illustrations with Kinetic Textures, Available Online at: https://hal.inria.fr/hal-00926847, Jun. 2014, pp. 351-360.

Kazi et al., Kitty: Sketching Dynamic and Interactive Illustrations, UIST '14 Proceedings of the 27th Annual ACM Symposium on User Interface Software and Technology, Oct. 5-8, 2014, pp. 395-405.

Kazi et al., Sandcanvas: A Multi-Touch Art Medium Inspired by Sand Animation, In Proceedings of the SIGCHI Conference on Human Factors in Computing Systems. ACM, Session: Expression & Perception, May 7-11, 2011, pp. 1283-1292.

Kendon et al., How Gesture Can Become Like Words, Cross-Cultural Perspective in Nonverbal Communication, Jan. 1988, pp. 131-141.

Kim et al., SketchStudio: Experience Prototyping with 2.5-Dimensional Animated Design Scenarios, Session 17 Immersive Experiences, Scenarios & Tachnologies, Jun. 9-13, 2018, pp. 831-843.

Kira, WIP Transportation History, Available Online at: https://youtu.be/IB3pdb3yXuY, Sep. 20, 2018, 3 pages.

Krueger et al., Videoplace—An Artificial Reality, In ACM SIGCHI Bulletin, vol. 16, Issue 4, Apr. 1985, pp. 35-40.

Landay et al., Interactive Sketching for the Early Stages of User Interface Design, Proceeding CHI '95 Proceedings of the SIGCHI Conference on Human Factors in Computing Systems, May 7-11, 1995, pp. 43-50.

Lee et al., Sketchstory: Telling More Engaging Stories with Data Through Freeform Sketching, IEEE Transactions on Visualization and Computer Graphics, vol. 19, No. 12, Dec. 2013, 10 pages.

Matulic et al., Embodied Interactions for Novel Immersive Presentational Experiences, CHI EA '16 Proceedings of the 2016 CHI Conference Extended Abstracts on Human Factors in Computing Systems, May 7-12, 2016, pp. 1713-1720.

McNeill, Hand and Mind: What Gestures Reveal About Thought, University of Chicago press, 1992, 15 pages.

(56) References Cited

OTHER PUBLICATIONS

Perlin, The Coming Age of Computer Graphics, In Sanders Series Lecture. TUX, https://www.youtube.com/watch?v=iWa4t9oa5zw, 2016, pp. 1-659.
Perlin, The Future of Computer Graphics, In SIGGRAPH Asia 2011, https://www.youtube.com/watch?v=4YnVhTyrYbo, 2011, pp. 1-57.
Resnick et al., Scratch: Programming for All, Communication of the ACM, vol. 52, No. 11, Nov. 2009, pp. 60-67.
Starner et al., Real-Time American Sign Language Recognition Using Desk and Wearable Computer Based Video, IEEE Transactions on Pattern Analysis and Machine Intelligence, vol. 20, No. 12, Dec. 1998, pp. 1371-1375.
Steins et al., Imaginary Devices: Gesture-Based Interaction Mimicking Traditional Input Devices, Mobile HCI 2013—Navigation and Selection, In Proceedings of the 15th International Conference on Human-Computer Interaction with Mobile Devices and Services, Aug. 28, 2013, pp. 123-126.
Wigdor et al., Rock & Rails: Extending Multi-Touch Interactions with Shape Gestures to Enable Precise Spatial Manipulations, In Proceedings of the SIGCHI Conference on Human Factors in Computing Systems, May 7-12, 2011, pp. 1581-1590.
Willett et al., Triggering Artwork Swaps for Live Animation, Session: Creativity Support Tools, UIST '17 Proceedings of the 30th Annual ACM Symposium on User Interface Software and Technology, Oct. 22-25, 2017, pp. 85-95.
Wilson et al., Bringing Physics to the Surface, UIST '08 Proceedings of the 21st Annual ACM Symposium on User Interface Software and Technology, Oct. 19-22, 2008, pp. 67-76.
Wilson et al., Combining Multiple Depth Cameras and Projectors for Interactions On, Above, and Between Surfaces, UIST'10 Proceedings of the 23nd annual ACM Symposium on User Interface Software and Technology, Oct. 3-6, 2010, pp. 273-282.
Yan et al., VirtualGrasp: Leveraging Experience of Interacting with Physical Objects to Facilitate Digital Object Retrieval, In Proceedings of the 2018 CHI Conference on Human Factors in Computing Systems, Paper No. 78, Apr. 21-26, 2018, 13 pages.
Zhu et al., Sketch-Based Dynamic Illustration of Fluid Systems, In ACM Transactions on Graphics (TOG), vol. 30, Issue 6, Article 134, Dec. 2011, 8 pages.
Sun, Leyi, "Gesture Commands with Kinect Gesture Recognition", https://medium.com/@sunx0578/gesture-commands-with-kinect-gesture-recognition-143a605150e6, Nov. 6, 2018, 8 pages.
Leap Motion, "Gestures", https://developer-archive.leapmotion.com/documentation/csharp/devguide/Leap_Gestures.html, 2019, 5 pages.

* cited by examiner

INTERACTIVE BODY-DRIVEN GRAPHICS FOR LIVE VIDEO PERFORMANCE

TECHNICAL FIELD

This disclosure generally relates to video processing and artificial reality. More specifically, but not by way of limitation, this disclosure relates to real-time, graphic-enhanced video.

BACKGROUND

Certain video editing programs include features for adding graphics to video. One simple but powerful way to augment a scene is to blend dynamic graphics with live action footage of real people performing. In the past, this technique has been used as a special effect for music videos, scientific documentaries, and instructional materials incorporated in the post-processing stage. Manipulating graphics in real-time is now becoming more popular in weather forecasts, live television shows, and, more recently, social media apps with video overlays. Augmented and mixed-reality technologies enable us to enhance and extend our perception of reality by incorporating virtual graphics into real-world scenes. Crafting an interactive and expressive performance with graphical elements interacting with a live performer typically requires technical programming or highly-specialized tools tailored for experts.

SUMMARY

Certain embodiments allow a user to map body movements to graphical manipulations for real-time human interaction with graphics. Certain embodiments involve mapping input actions of a user to output graphical effects. For example, in some embodiments a system for real-time graphics interactions with user motions includes a motion-sensing device configured to track body position of a user to obtain a skeletal map of the user; a camera configured to obtain a video of the user; a screen; and/or a memory device containing instructions that, when executed, cause one or more processors to perform the following steps: creating a link between a node of a reference skeleton and a graphical element; receiving from a user a selection of an output effect from a discrete set of output effects; capturing the video of the user, using the camera, wherein the video depicts a body position of the user; correlating the reference skeleton to the skeletal map of the body position of the user in the video, so that nodes of the reference skeleton correspond to points of the skeletal map; presenting the video on the screen; overlaying the graphical element on the video; and/or modifying the graphical element, as overlaid on the video, according to the output effect and the link between the node of the reference skeleton and the graphical element. In some embodiments, the memory device contains instructions that cause the one or more processors to perform the following steps: mapping a posture of the reference skeleton to a trigger event, wherein the trigger event is overlaying the graphical element on the video; identifying the posture of the reference skeleton based on body position of the user in the video; overlaying the graphical element on the video based on identifying the posture of the reference skeleton; mapping a dynamic gesture to a trigger event, wherein the trigger event is overlaying the graphical element on the video; identifying the dynamic gesture in the video based on movement of the reference skeleton; determining a position and relative size of the dynamic gesture; overlaying the graphical element on the video at the position; sizing the graphical element according to the relative size of the dynamic gesture; creating links between three or more nodes of the reference skeleton and three or more anchor points of the graphical element; modifying the graphical element by changing relative spacing of the three or more anchor points in response to relative change in spacing between the three or more nodes of the reference skeleton; determining that the user is pointing to the graphical element based on positions of nodes of the reference skeleton; selecting the graphical element for modification based on determining that the user is pointing to the graphical element; incrementally modifying the graphical element based on a dynamic semaphoric gesture of the reference skeleton; receiving a defined path from the user, and constraining translation of the graphical element to the defined path while overlaying the graphical element during presentation of the video; and/or presenting the video and overlaying the graphical element on the video no more than two seconds after capturing the video. In some embodiments, the discrete set of output effects comprises two or more output effects selected from the group consisting of: translation, rotation, change in opacity, change in scale, deformation, and change in speed; the output effect is a first output effect; the graphical element is a first graphical element; and/or the method further comprises: creating a link between the first graphical element and a second graphical element, receiving from the user a selection of a second output effect from the discrete set of output effects, and/or overlaying the second graphical element on the video according to the second output effect and the link between the first graphical element and the second graphical element while presenting the video, such that as the first graphical element is modified, the second graphical element is also modified.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
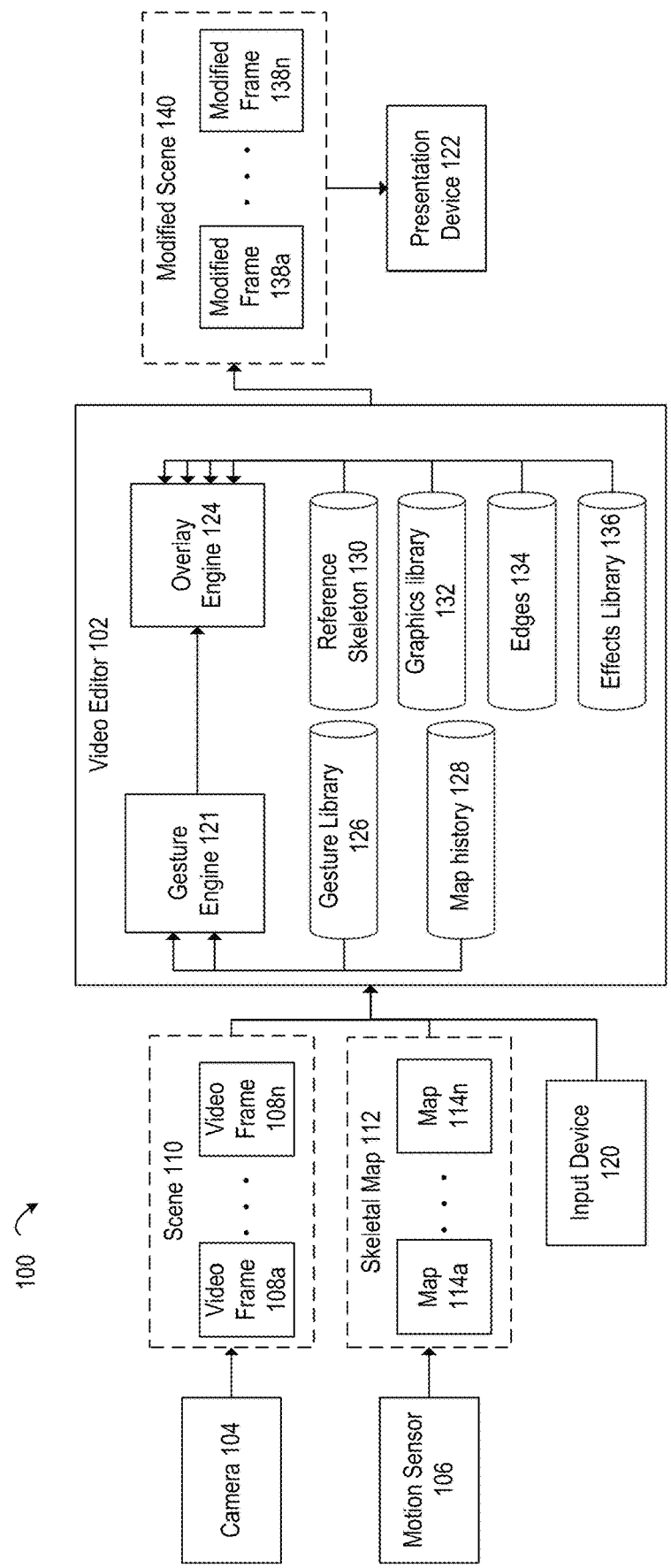
FIG. 1 depicts an example of a video processing environment for real-time, body-driven graphics, according to certain aspects of this disclosure.

Real-time presentations with interactive graphics can create a powerful new storytelling environment. Certain aspects involve a presenter (e.g., a user) preparing slides before a video presentation by importing graphical elements and mapping input actions (such as gestures) to output graphical effects (such as moving, resizing, changing opacity, and/or deforming a graphic) using nodes of a reference skeleton representing a person, pins (e.g., anchors) on a graphic, and edges (e.g., links) between the nodes of the reference skeleton and the pins. Then, in a presentation mode, the presenter interacts with graphical elements in real-time by using the mapping to trigger and interact with the graphical elements with body position and/or movement. This kind of augmented presentation leverages a presenter's innate, everyday skills to enhance his or her communication capabilities with an audience. By simplifying mapping between gestures and corresponding output effects, a user interface can enable users, from various backgrounds, to create customized, rich interactions with the graphical elements in real time. Interactions with graphics in real time can enhance communication and shape real-time, virtual communication capabilities by enabling people to leverage whole-body language, speech, and context.

The following non-limiting example is provided to introduce certain embodiments. In this example, a user defines interactions with a virtual object. The virtual object can be a graphical element, such as an image or an animated graphic. A video editor presents a user interface to the user. In the user interface, the video editor presents a reference skeleton. The user can drag-and-drop a graphical element in the user interface. The user can define a link between a node of the reference skeleton to the graphical element by drawing an edge (e.g., a line) to connect the node of the reference skeleton with a pin (e.g., anchor) on the graphical element. The video editor creates a link between the node of the reference skeleton and the graphical element based on the edge. Based on the video editor creating the link between the node of the reference skeleton and the graphical element, the video editor presents, in the user interface, a discrete set of output effects. The video editor receives from the user a selection of an output effect from the discrete set of output effects. Examples of output effects can include translation of the graphical element, rotation of the graphical element, change in opacity of the graphical element, change in scale of the graphical element, and/or change in speed of the graphical element. A camera is used to capture a video of the user. The video depicts a body position of the user. A motion sensor is used to capture body position of the user while the camera captures the video of the user, and the motion sensor generates a skeletal map of the body position of user in the video. The video editor correlates the reference skeleton to the skeletal map so that nodes of the reference skeletons correspond to points of the skeletal map. The video editor presents the video and overlays a graphical element on the video to generate a modified scene. The video editor modifies the graphical element according to the output effect selected by the user and the link between the node of the reference skeleton and the graphical element. For example, if the user defines three edges by connecting three nodes of the reference skeleton to three pins on the graphical element, then the video editor moves and deforms the graphical element based on relative movement of a skeletal map of the user corresponding to the three nodes of the reference skeleton. Thus the user can define how the graphical element is to be manipulated. By providing a simplified user interface, users will be able to more simply and/or more effectively generate graphics that interact with body movements of a user in a video.

Example of an Operating Environment for Real-Time, Body-Driven Graphics

Referring now to the drawings, FIG. 1 depicts an example of a video processing environment 100 for performing real-time, body-driven graphics. Video processing for real-time, body-driven graphics can involve adding graphics to a video that interact with a user's motion. The video processing environment 100 includes a set of communicatively coupled components. These components include a video editor 102 that can be executed on one or more computing devices, a camera 104, an input device 120, a motion sensor 106, and a presentation device 122 that displays video content.

The camera 104 is configured to acquire a set of video frames 108*a-n* of a scene 110. The motion sensor 106 is a motion-sensing device configured to generate a skeletal map 112 of a person in the scene 110. For example, the motion sensor 106 is a Microsoft Kinect that can sense body movement of a person in the scene 110 and create a skeletal map 112. In some embodiments, the motion sensor comprises a red, green, blue (RGB) color video camera, a depth sensor, and/or a multi-array microphone. The RGB color video camera can be used as the camera 104. The skeletal map 112 is a representation of body position of the person. For example, the skeletal map 112 contains a set of points in two-dimensional or three-dimensional space at which body parts (e.g., head, joint, etc.) of the person are positioned. For instance, a set of maps 114*a-n* of the skeletal map 112 is generated, wherein each of the maps 114*a-n* is a skeletal map representing body position of the person at a given time, and the set of maps 114*a-n* represent position of the person over time. In some embodiments, an adaptive naive Bayes Classifier (ANBC) for static pose recognition (with angles between skeletal joints as features) is used. In the embodiment shown, there is a one-to-one relationship between the set of set of video frames 108*a-n* and the set of maps 114a-n, such that one frame 108 corresponds to one map 114. However, in other embodiments there is not a one-to-one relationship between the set of maps 114a-n and the set of video frames 108a-n. For example, one map of the set of maps 114a-n can be generated for 5, 10, 20, 50, 100, or more frames of the set of video frames 108a-n. The set of video frames 108a-n and the set of maps 114a-n are fed to the video editor 102.

The input device 120 can include one or more components for importing data, such as a keyboard, a mouse, a stylus, etc. In some embodiments, the input device 120 can include a clicker (e.g., a wearable clicker) for the user to have interactive control during a presentation (e.g., to advance between graphics; trigger a graphic; for a graphic to appear, disappear, fade, etc.).

The video editor 102 includes program code for displaying and editing video content. For instance, the video editor 102 can include program code for rendering content for display, overlaying graphical elements on a video, and/or program code for modifying graphical elements in real time in response to body movement of a user. In this example, the video editor 102 comprises a gesture engine 121 and an overlay engine 124. The video editor 102 further comprises a gesture library 126, map history 128, reference skeleton 130, graphics library 132, edges 134, and effects library 136.

The gesture library 126 comprises a set of predetermined gestures. Gestures can be static or dynamic. A static gesture is a stationary position. Static gestures include, for example, pointing and body posture. A dynamic gesture changes body position in a specified way over time. Dynamic gestures include, for example, pantomimic gestures and direct manipulation. A static gesture can be identified by one map 114 of the set of maps 114a-n or a plurality of the set of maps 114a-n by the skeletal map 112 not changing position in the plurality of the set of maps 114a-n for a given duration (e.g., 0.5, 1, 2, or 5 seconds). A dynamic gesture can be identified by tracking changes of the skeletal map 112 in multiple maps 114 of the set of maps a-n. The map history 128 stores data of the set of maps 114a-n. The gesture engine 121 includes program code that, when executed by processing hardware, performs one or more operations for identifying gestures performed by a person in the scene 110. By using the map history 128, the gesture engine 121 can compare the map history 128 to gestures in the gesture library 126 to determine if the person has performed a certain gesture. As a certain gesture is detected, the gesture engine 121 can transmit an indication that the gesture has been performed to the overlay engine 124. In some embodiments, a gesture is a change in the skeletal map 112. For graphical transformations of non-rigid deformation, an as-rigid-as-possible mesh deformation algorithm with control points can be used. For graphical transformations of rigid graphical elements, an optimum rotation and position of the rigid graphical element can be based on control points average angle and position difference from nodes of the reference skeleton.

The reference skeleton 130 comprises a plurality of nodes meant to represent a person. Graphical elements are stored in graphics library 132. A graphical element can be an image, an animation, an animated graphic (e.g., using animated graphics interchange format GIF), and/or a video to be to be added to video frames 108. Effects library 136 contains a predetermined set of output effects. The overlay engine 124 receives the set of maps 114a-n, the set of video frames 108a-n, and/or data from the gesture engine 121.

The overlay engine 124 maps graphical elements to the reference skeleton 130 by edge(s) 134. A graphical element is modified based on the edge(s) 134 to the reference skeleton 130 and the output effect selected from the effects library 136. The overlay engine 124 includes program code that, when executed by processing hardware, performs one or more operations for overlaying graphical elements on the set of video frames, according to the edges 134 linking the reference skeleton 130 to the graphical element and the output effects from the effects library 136. The overlay engine 124 generates a set of modified frames 118a-n to form a modified scene 140. The presentation device 122 is used to present the modified scene 140. In some embodiments, the modified scene 140 is presented on the presentation device 122 in real-time (e.g., presenting a modified scene 140 on the presentation device 122 no more than 0.5 seconds, 1 second, 2 seconds, or 5 seconds after the camera 104 acquires a video frame 108 of the scene 110). In some embodiments, the display reverses a modified scene, as a mirror, for a presenter to watch as the presenter interacts with graphical elements. In some embodiments, the presentation device 122 can be wearable mixed-reality eyeglasses or a headset and have a viewpoint of the presenter. The wearable mixed-reality eyeglasses or headset can be used to reduce mental overload of the presenter interacting with graphical elements. Sensors on the wearable mixed-reality eyeglasses or headset could also be used to improve accuracy of overlaying graphical elements.

While FIG. 1 depicts a video editor 102 that includes a gesture engine 121, an overlay engine 124, a gesture library 126, map history 128, reference skeleton 130, graphics library 132, edges 134, and effects library 136, other implementations are possible. For instance, in various aspects, one or more components shown as part of the video editor 102 can be omitted, functionality of components can be combined, and/or one or more components can be included in software that is separate from and in communication with the video editor 102.

In an illustrative example, the camera 104 acquires video frames 108a-n of a scene 110 of a person in an apartment. The camera 104 can be part of a laptop, a mobile device, Kinect, or standalone. The motion sensor 106 acquires a set of maps 114a-n of a skeletal map 112 (e.g., from a Kinect senor). The person gestures with hands out in front as if turning a steering wheel of a car. The set of maps 114a-n are stored in the map history 128 of the video editor 102. The gesture library 126 comprises identification of a gesture with hands positioned in front of a person's body. The gesture engine 121 identifies the gesture of hands positioned in front based on the map history 128. For example, for the gesture with the hands positioned in front to be identified as an intentional gesture, the set of maps 114a-n contains a skeletal map 112 of hands positioned in front in a subset of at least 5, 10, 20, or 50 consecutive maps from the set of maps 114a-n; or in a subset of the maps 114a-n corresponding to at least 0.5 seconds, 0.75 seconds, or 1 second. Gesture engine 121 sends an indication to the overlay engine 124 that the gesture of hands positioned in front has been identified. Based on the indication that the gesture of hands positioned in front has been identified, the overlay engine 124 selects a graphical element of a steering wheel from the graphics library 132 based on identifying a reference skeleton 130 mapped to an image of the steering wheel by edges 134. One edge 134 connects a left hand of the reference skeleton 130 with one side of the image of the steering wheel, and another edge 134 connects a right hand of the reference skeleton 130 with another side of the image of the steering wheel. The overlay engine 124 generates modified frames 138 by overlaying the image of the steering wheel on video frames 108 at a location so that one side of the image of the steering wheel is in a left hand of a person in the video frame 108 and another side of the image of the steering wheel is at a right hand of the person in the video frame 108. As the person rotates both hands, the overlay engine 124 rotates the image of the steering wheel in the modified scene 140, so that the steering wheel appears to rotate as the person in the scene 110 rotates hands back and forth. By overlaying the image of the steering wheel, someone watching the presentation device 122 sees the person in the apartment appear to be turning the steering wheel, even though there is no steering wheel in the apartment.

Figure 2:
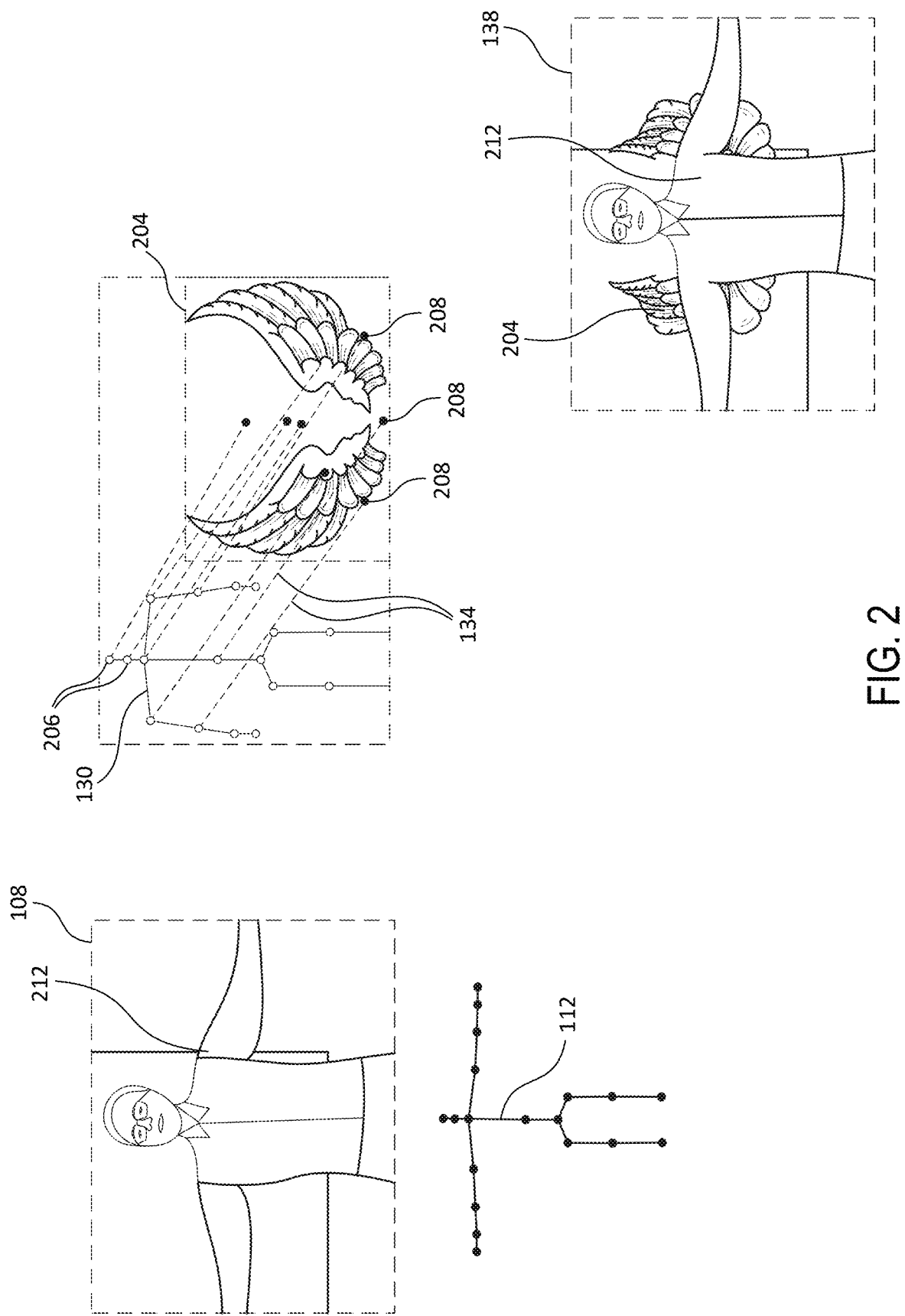
FIG. 2 depicts an example of modifying a video frame to add an interactive graphic by the video processing environment of FIG. 1, according to certain aspects of this disclosure.

FIG. 2 depicts an example of modifying a video frame to add an interactive graphic by the video processing environment of FIG. 1. In this example, the video editor 102 identifies a gesture, based on the set of maps 114*a-n* of the skeletal map 112 in the map history 128, and a gesture in the gesture library 126. For instance, the video editor 102, or other suitable software, could map a graphical element 204 (e.g., of wings) to a reference skeleton 130 using edges 134. An edge 134 is a link between a node 206 of the reference skeleton 130 and an anchor point 208 (e.g., pin) of the graphical element 204. In FIG. 2, there are eight edges 134 connecting eight nodes 206 of the reference skeleton 130 to eight anchor points 208 of the graphical element 204.

A video frame 108 with a person 212 in the video frame is shown in FIG. 2. The video frame 108 is acquired by the camera 104. A skeletal map 112 of the person 212 is also shown. The person 212 has his arms out to the sides in the video frame 108. Accordingly, the skeletal map 112 in FIG. 2 has points representing arms out to the side.

The overlay engine 124 correlates the reference skeleton 130 with the skeletal map 112 so that the reference skeleton 130 has a similar shape as the skeletal map 112. As the reference skeleton 130 is correlated to the skeletal map 112, the graphical element 204 is modified (e.g., deformed). The overlay engine 124 overlays the graphical element 204 on the video frame 108 to generate a modified frame 138. As the person 212 moves his arms up and down (e.g., as if to flap wings), the overlay engine 124 modifies the graphical element 204 (e.g., deforms the graphical element 204), based on the edges 134 between nodes 206 of the reference skeleton 130 and anchor points 208 of the graphical element 204.

Example of a User Interface for Mapping Input Actions to Output Effects

Figure 3:
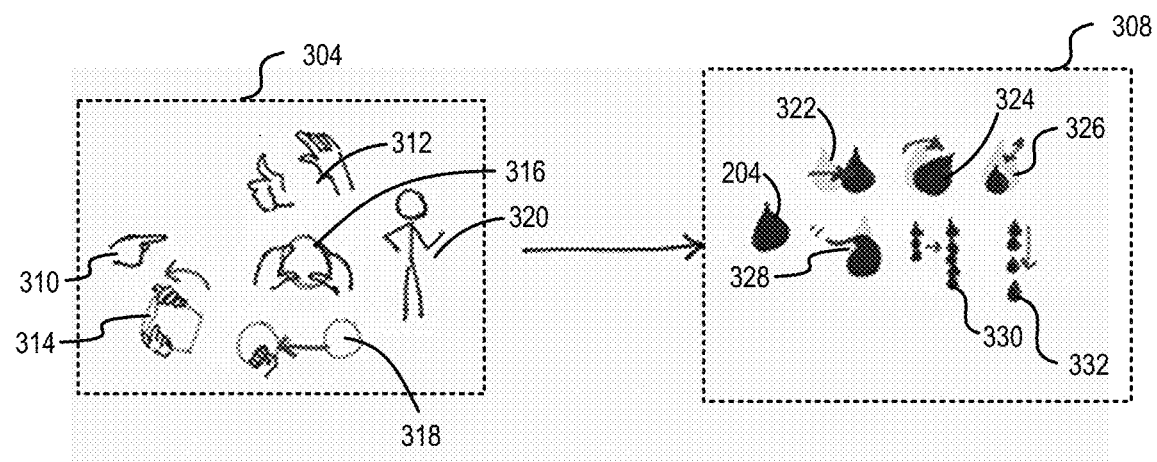
FIG. 3 depicts an example of mapping input actions to output effects, according to certain aspects of this disclosure.

FIG. 3 depicts a simplified example of input actions that can be mapped to output effects. A variety of input actions 304 (e.g., gestures) can be mapped to output effects 308 using the video processing environment 100. The video processing environment 100 can be used to enable a user to define their own mapping from input actions to output effects.

Input actions can be dynamic or static. Examples of gestures include pointing gesture 310, semaphoric gesture 312, pantomimic gesture 314, iconic gesture 316, and direct manipulation gesture 318. Posture 320 can be a static semaphoric gesture. Pointing gesture 310 indicates a direction. A semaphoric gesture 312 can be a hand movement or posture that conveys a specific meaning (e.g., a hand swipe up or a flicking gesture can be used to indicate to the video editor to move a graphical element in an upward direction or to change a size of the graphical element). Semaphoric gestures can be learned by the gesture engine 112 (e.g., pre-defined by the user and stored in the gesture library 126). A semaphoric gesture 312 can be used to indirectly manipulate a graphical element and/or change a parameter value of an output effect. A pantomimic gesture 314 can be used to mimic an interaction with an imaginary, virtual object. For example, a user can use both hands to manipulate a graphical element (e.g., pantomiming moving a steering wheel). An iconic gesture 316 (e.g., drawing a rectangle in the air) can be used to determine a size and/or position of a graphical element. In some embodiments, a gesture can be a movement of a point of a skeletal map 112. For example, for a manipulation gesture 318, a graphical element moves in relation to a hand of the skeletal map 112.

FIG. 3 shows another example of a graphical element 204. Output effects 308 can include transformation of the graphical element 204, such as a translation 322, a rotation 324, or a change in scale 326. Output effects 308 can include deformation 328 of the graphical element 204, a change in quantity 330 of the graphical element 204, and/or a change in speed 332 of the graphical element (e.g., a change in speed of an animation rate of a GIF file). The output effect 308 can also be a trigger event to begin to overlay the graphical element 204 on a video frame 108.

Figure 4:
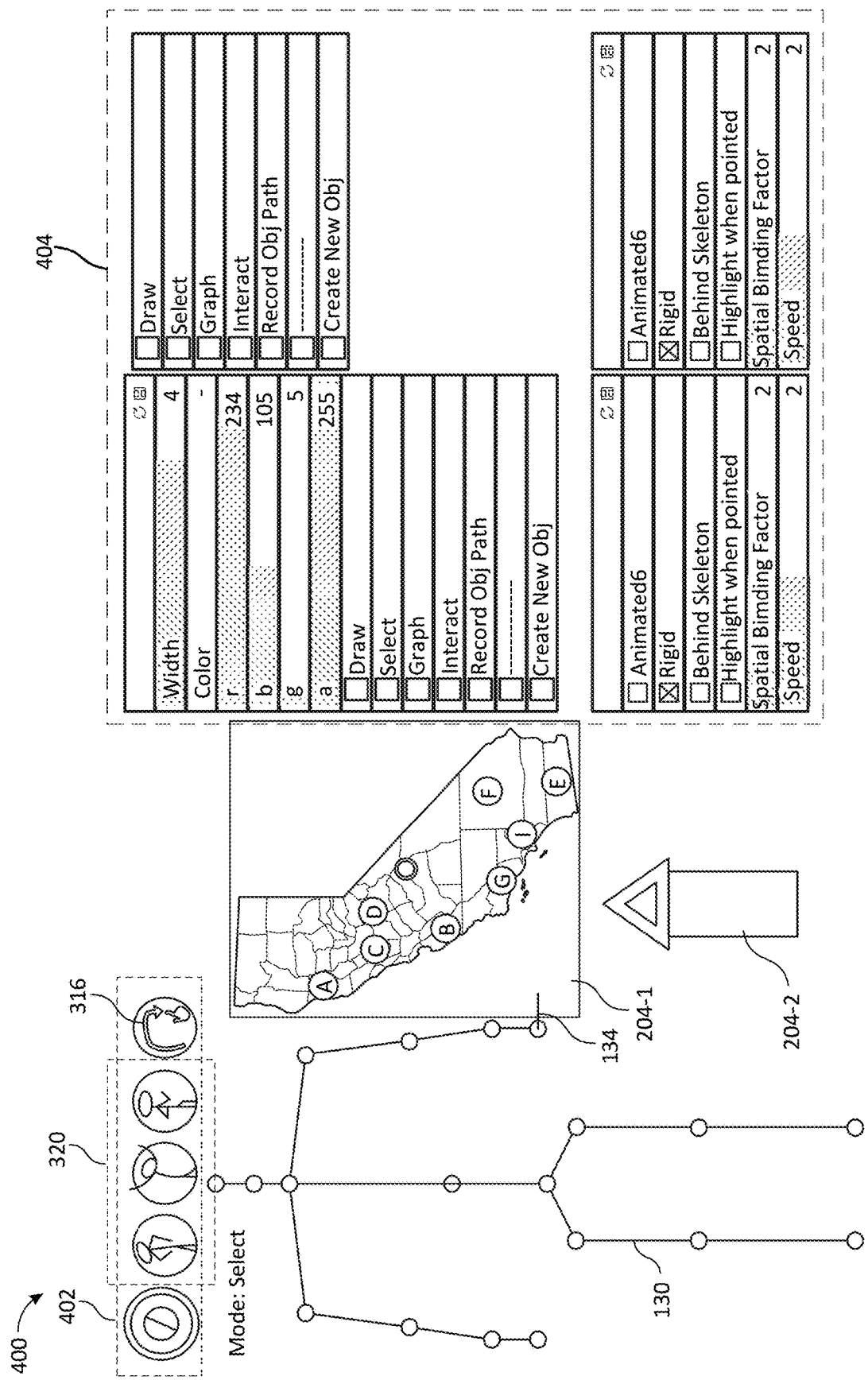
FIG. 4 depicts an embodiment of a user interface for mapping input actions to output effects, according to certain aspects of this disclosure.

FIG. 4 depicts an embodiment of a user interface 400 (e.g., a graphical user interface) for mapping input actions 304 to output effects 308. In some embodiments, the user interface 400 is used to provide a simplified and/or effective means for a user to map input actions 304 to output effects 308. The user interface 400 includes program code for displaying a reference skeleton 130, graphical elements 204, icons 402, and/or menus 404. The user interface 400 is part of the video editor 102 (e.g., part of the overlay engine 124). The user interface 400 also includes program code for detecting user inputs with respect to reference skeleton 130, graphical elements 204, icons 402, and/or menus 404, as described below. The user interface 400 also includes program code for providing instructions to one or more engines of the video editor 102 that correspond to user input, where these instructions implement various operations described below.

The user interface 400 can receive, from a user, a selection of a graphical element 204. For example, the user interface 400 can provide a draw mode for a user to draw a graphical element 204. The user interface 400 shows a first graphical element 204-1 and a second graphical element 204-2. The first graphical element 204-1 is an image. The second graphical element 204-2 is an arrow, drawn by a user. The user interface 400 can receive from a user a selection of a graphical element by a user dragging and dropping a graphical element. Graphical elements 204, e.g., drawn or dropped by the user, are added to the graphics library 132. For example, using a selection tool, the user can select, move, edit, and delete a graphical element 204.

The user interface 400 can receive, from the user, a selection of a gesture. A gesture can be selected by the user clicking an icon 402 or connecting a node of the reference skeleton 130 a graphical element 204 by an edge 134. Icons 402 can represent gestures of posture 321 or an iconic gesture 316. Gestures represented by icons 402 can be stored in the gesture library 126. The gesture library can include one or more customizable templates of static posture. In some embodiments, the gesture library 126 can include a gesture defined by the user.

The user can select an output effect 308 by menus 404 and/or an effect menu responsive to creating an edge 134 from a node of the reference skeleton 130 to a graphical element 204. Menus 404 can be used to further refine output effects. For example, a box can be selected to keep a graphical element 204 rigid, to animate a graphical element 204, and/or to define spatial binding of a graphical element (e.g., so that the graphical element 204 does not interact with the user unless the skeletal map is within a specified distance of the graphical element).

Figure 5:
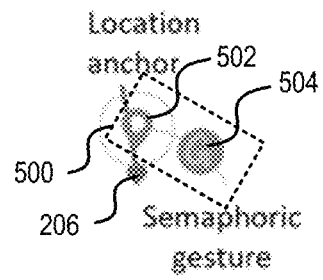
FIG. 5 depicts an embodiment of a node menu, according to certain aspects of this disclosure.

FIG. 5 depicts an embodiment of a node menu 500. The node menu 500 appears in the user interface 400 responsive to a node 206 being selected and/or an edge 134 connecting the node 206 to a portion of a graphical element 204. The user can select a location anchor 502 or a semaphoric gesture 504. If the location anchor 502 is selected, then the graphical element 204 moves with the node 206. If semaphoric gesture 504 is selected, then an output effect used to modify the graphical element 204 is based on a semaphoric gesture 504 using the node 206. For example, the node 206 could represent a hand on the reference skeleton 130. When a user moves the hand in an upward gesture (a semaphoric gesture), the graphical element 204 could increase in size.

Figure 6:
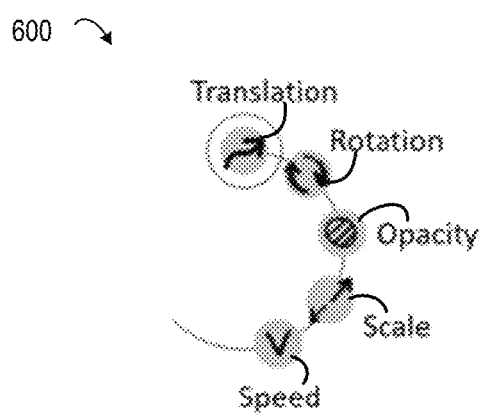
FIG. 6 depicts an embodiment of an effects menu, according to certain aspects of this disclosure.
Figure 7D:
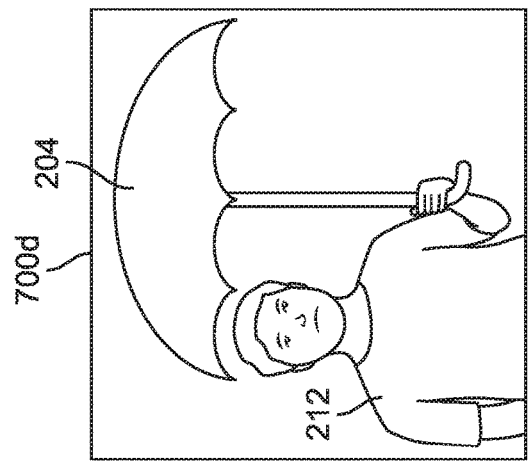
FIG. 7 depicts an example of direct manipulation of a graphical element, according to certain aspects of this disclosure.
Figure 7E:
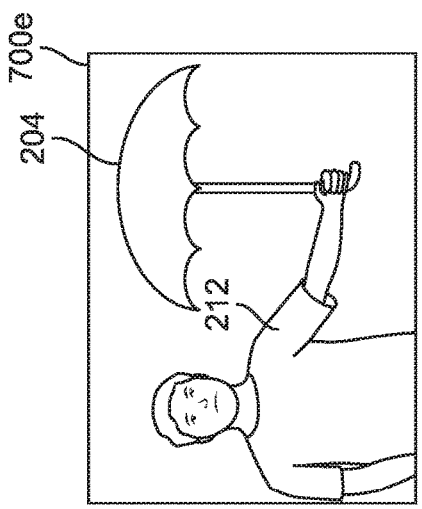
Figure 7C:
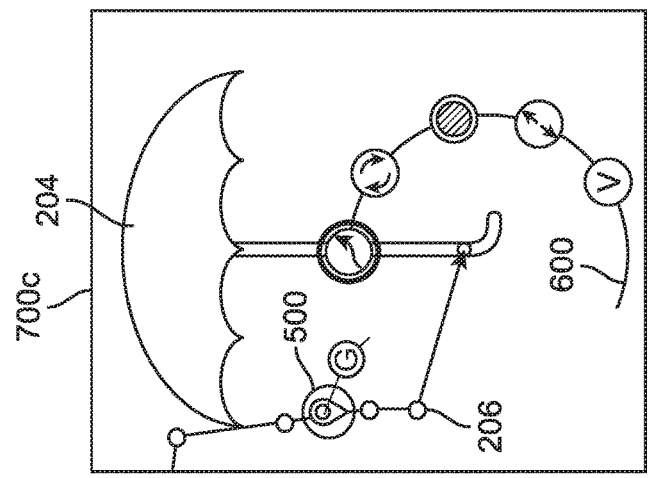
Figure 7A:
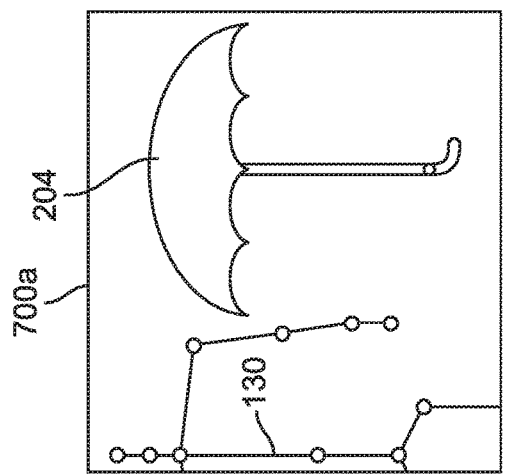
Figure 7B:
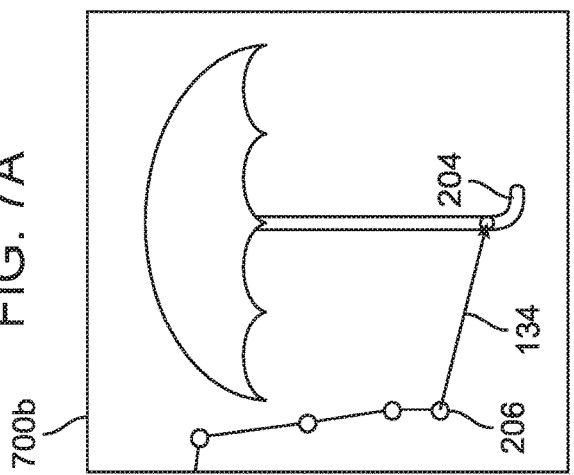

FIG. 6 depicts an embodiment of an effects menu 600. The effects menu 600 appears in the user interface 400 responsive to an edge 134 connecting the graphical element 204 to a node 206 of the reference skeleton 130. The effects menu 600 can appear around an anchor point 208. The effects menu 600 has a discrete set of output effects. In the effects menu 600, the output effects include translation, rotation, opacity, scale, and speed. Translation moves the graphical element 204, or an anchor point 208 of the graphical element 204. Rotation rotates the graphical element 204. Opacity changes the degree to which objects in a first layer, which are positioned beneath a second layer in which the graphical element 204 is positioned, are visible through the graphical element 204. Scale changes a size of the graphical element 204 within a graphical interface (e.g., the size of the graphical element 204 relative to the skeletal map and/or to one or more other graphical elements). Speed changes how fast a graphical element, such as a GIF, completes an animation cycle. The user can select an output effect from the effects menu 600 to control how the graphical element 204 responds to movement of a node 206 of the reference skeleton 130. Output effects are normalized, having a parameter value from zero to 1, wherein the user can set the parameter value for an output effect. Accordingly, the discrete set of output effects in the effects menu 600 can include two or more output effects selected from the group consisting of translation, rotation, change in opacity, change in scale, and change in speed.

Example of Direct Manipulation

FIG. 7 depicts an example of direct manipulation of a graphical element 204. In FIG. 7, a user is presented a reference skeleton 130 in the user interface 400. The user selects a graphical element 204, which is an umbrella drawn by the user, shown in stage 700a. The user draws an edge 134 by clicking on a node 206 and dragging a line to the graphical element 204, as shown in stage 700b. The node 206 corresponds to a left hand of the reference skeleton 130 in stage 700b. The video editor 102 maps the graphical element 204 of the umbrella to the node 206 of the left hand of the reference skeleton 130 based on the edge 134 connecting the node 206 to the graphical element 204.

In stage 700c, the user interface 400 presents the user with the node menu 500 and the effects menu 600, responsive to the edge 134 being made. Stage 700c shows the location anchor in the node menu 500 and translation in the effects menu 600 selected. Accordingly, the overlay engine 124 will move the graphical element 204 of the umbrella as the left-hand of the user moves. Stage 700d shows a person 212 with his left hand near his body and the graphical element 204 of the umbrella is positioned at the user's left-hand. As the person 212 moves his left hand away from himself, the overlay engine 124 moves the graphical element 204 of the umbrella to stay with the left-hand of the user, stage 700e.

Example of Constrained Movement

Figure 8:
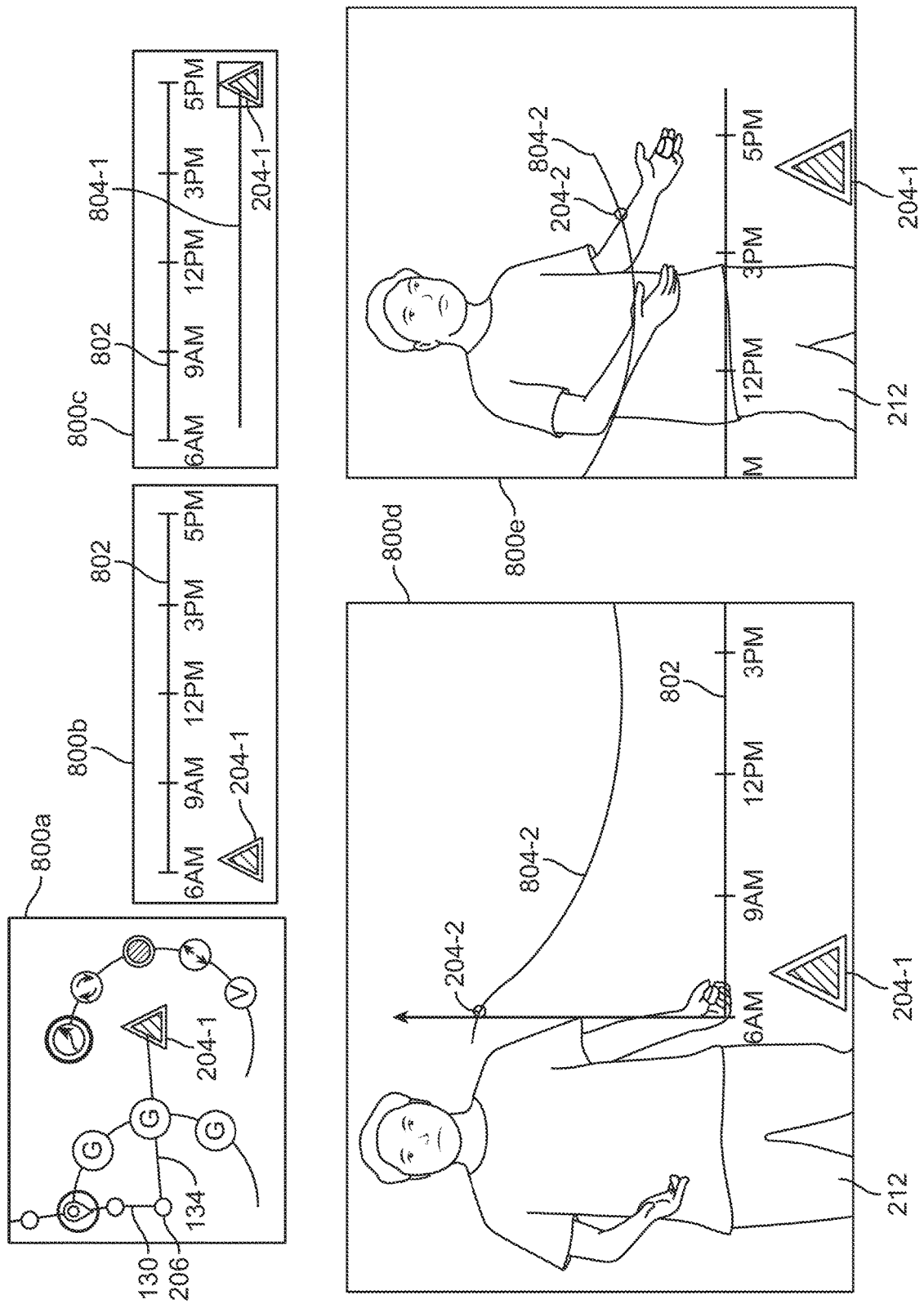
FIG. 8 depicts an example of constraining movement of a graphic to a path, according to certain aspects of this disclosure.

FIG. 8 depicts an example of constraining movement of a graphic to a path. In stage 800a, a node 206 of a reference skeleton 130 is linked to a first graphical element 204-1. For example, the user draws an edge 134 from the node 206 of the reference skeleton 130 to the first graphical element 204-1. The first graphical element 204-1 is a triangle. The user selects an anchor point for the node 206 in a node menu and selects a translation effect in an effects menu. In stage 800b, a timeline 802 is drawn in relation to the first graphical element 204-1. For example, the user draws the timeline 802 using draw functionality of the user interface. The timeline 802 is another graphical element. In stage 800c, a first path 804-1 is drawn. For example, the user draws the first path 804-1 and designates the first path 804-1 as a path for the first graphical element 204-1, which indicates to the overlay engine 124 that the first graphical element 204-1 is to be constrained to the first path 804-1. In stage 800d, a modified frame is shown with a person 212 in a scene and the first graphical element 204-1 overlaid on the scene with the person 212. The timeline 802 is also shown overlaid on the scene. A second graphical element 204-2 is linked to the first graphical element 204-1. For example, in the user interface the user creates an edge between the first graphical element 204-1 and the second graphical element 204-2 and selects translation as an output effect of the second graphical element 204-2. The second graphical element 204-2 is configured to be constrained to a second path 804-2. For example, the user draws the second path 804-2 and designates the second graphical element 204-2 to translate along the second path 804-2. A motion sensor generates a skeletal map of the user in the video. The reference skeleton 130 is correlated to the skeletal map of the user in the video. As the person 212 moves his left hand from the left of the modified scene to the right of the modified scene, the first graphical element 204-1 moves from left to right along the first path 804-1, because the first graphical element 204-1 is linked to the left-hand of the reference skeleton 130. The second graphical element 204-2 also moves from left to right, constrained to the second path 804-2, because the second graphical element 204-2 is linked to movement of the first graphical element 204-1.

Since the first graphical element 204-1 is constrained to move along the first path 804-1, the first graphical element 204-1 moves along a smooth, predefined path even though the hand of the person 212 may move erratically. Though the output effect selected for the first graphical element 204-1 is a translation, a second output effect, different from a first output effect of the first graphical element 204-1 can be selected. For example, as the first graphical element 204-1 moves from left to right, the second graphical element 204-2 could be configured to change in scale or change in opacity, instead of moving along the second path 804-2. Additional graphical elements can be manipulated. For example, the first graphical element 204-1 and/or the second graphical element 204-2 could be used to manipulate a third graphical element; the third graphical element, either alone or with another graphical element, could be used to manipulate a fourth graphical element, and so on.

Example of a Pantomimic Gesture

Figure 9:
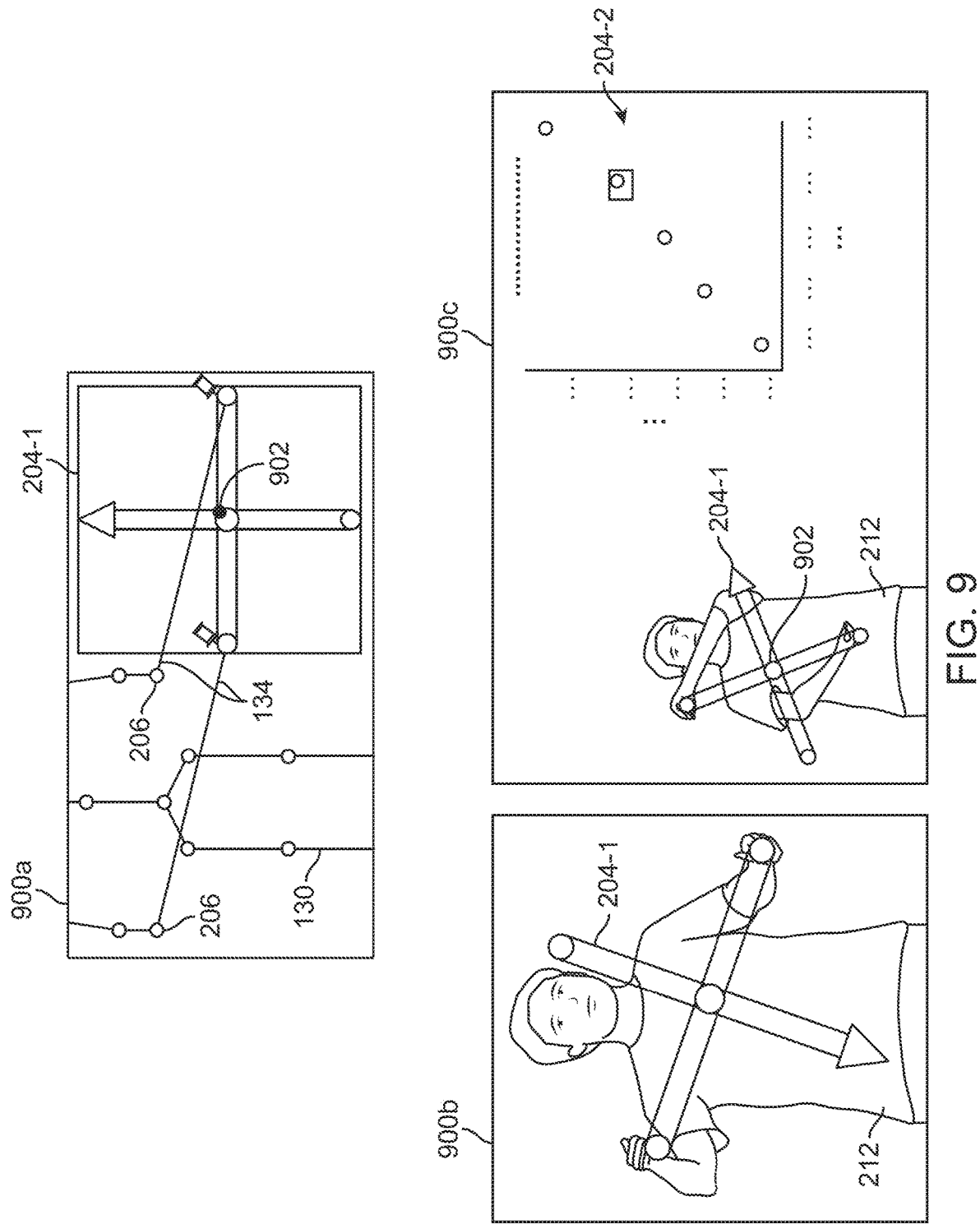
FIG. 9 depicts an example of modifying a graphic using a pantomimic gesture, according to certain aspects of this disclosure.

FIG. 9 depicts an example of modifying a graphic using a pantomimic gesture. In stage 900a, two nodes 206 of a reference skeleton 130 are linked to a first graphical element 204-1. For example, the user draws edges 134 between two nodes 206 of the reference skeleton and pins of the first graphical element 204-1, using the user interface. The user selects a rotation center 902. The first graphical element 204-1 is configured to not change in scale (e.g., by checking a box in menu 404 of the user interface 400). Stage 900b shows the person 212 in the scene and the first graphical element 204-1 overlaid on the scene with one side of the first graphical element 204-1 over a left hand of the person 212 and another side of the first graphical element 204-1 over a right hand of the person 212, as linked in stage 900a. The overlay engine overlays the first graphical element 204-1 based on correlating the reference skeleton 130 with a skeletal map of the user. In some embodiments, the overlay engine computes optimum rigid transformation parameters (e.g., position and rotation) of the graphical element to best match hand positions. As the person 212 rotates his hands, the first graphical element 204-1 rotates about the rotation center 902. The first graphical element 204-1 is linked to a second graphical element 204-2. The second graphical element 204-2 is a chart. The second graphical element 204-2 is configured to translate data in the chart as the first graphical element 204-1 is rotated. Thus, as the person 212 pantomimes rotating a lever (e.g., the first graphical element 204-1), it appears that the person 212 is using the lever to manipulate data in the chart of the second graphical element 204-2.

Example of Triggering Using an Iconic Gesture

Figure 10:
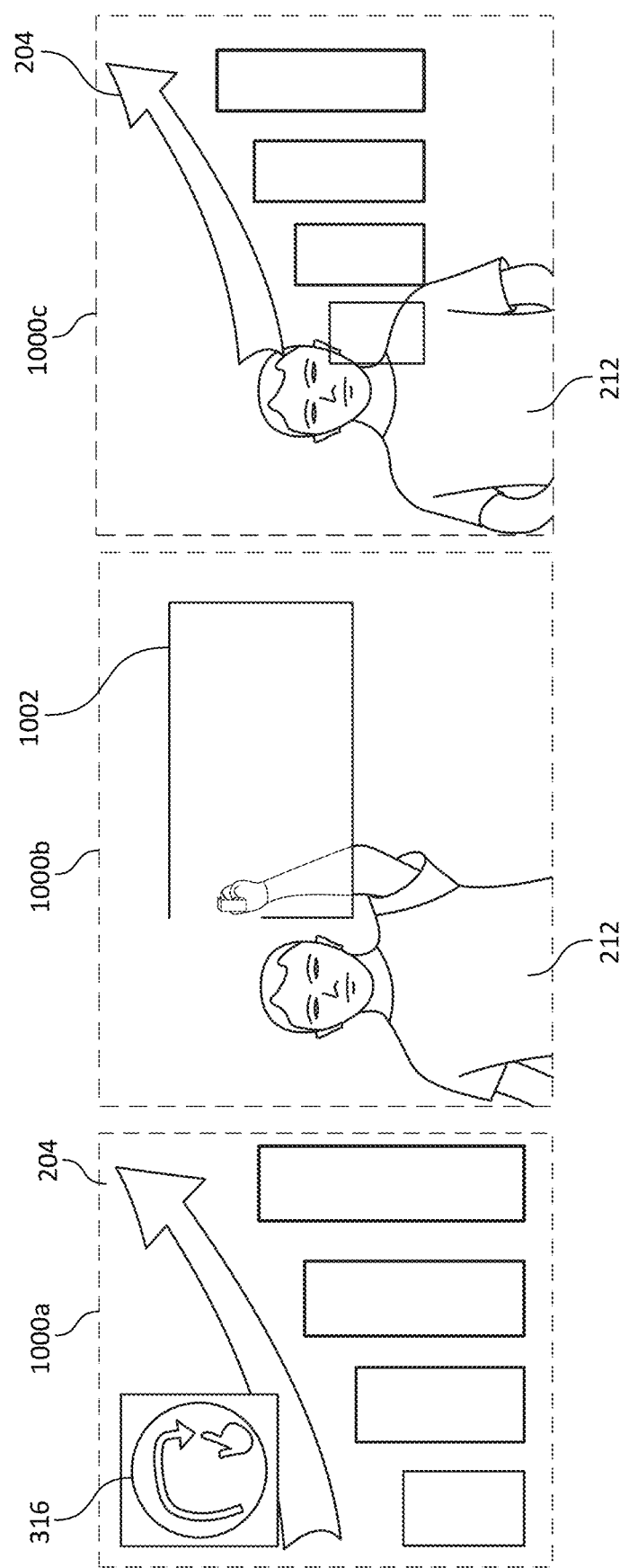
FIG. 10 depicts an example of triggering a graphic using an iconic gesture, according to certain aspects of this disclosure.

FIG. 10 depicts an example of triggering a graphic using an iconic gesture. To trigger a graphic using iconic gesture, the user selects the iconic gesture 316 button and a graphical element 204, stage 1000a. A camera acquires video of a person in a scene while a motion sensor generates a skeletal map of the person. As the person 212 in the scene moves to make a trace 1002, the gesture engine identifies the trace based on the set of maps 114a-n of skeletal map 112 in map history 128. Trace 1002 is shown in stage 1000b, however trace 1002 is not part of the modified scene. Instead, trace 1002 is shown in stage 1000b to indicate movement of a hand of the person 212. Responsive to the gesture engine identifying the trace 1002 as an iconic gesture, the overlay engine inserts the graphical element 204 into the modified scene, stage 1000c. In some embodiments, a size of the graphical element 204 and/or a position of the graphical element 204 in the modified scene is based on a position of the trace 1002 and/or a size of the trace 1002. Thus, if the trace 1002 was smaller than depicted in stage 1000b, then the graphical element 204 in stage 1000c would be smaller. In some embodiments, the actual shape of the trace 1002 (e.g., rectangular, circular, triangular) is not taken into account, and only the position and size of the gesture are used.

Example of Using a Pointing and a Semaphoric Gesture to Manipulate a Graphic

Figure 11:
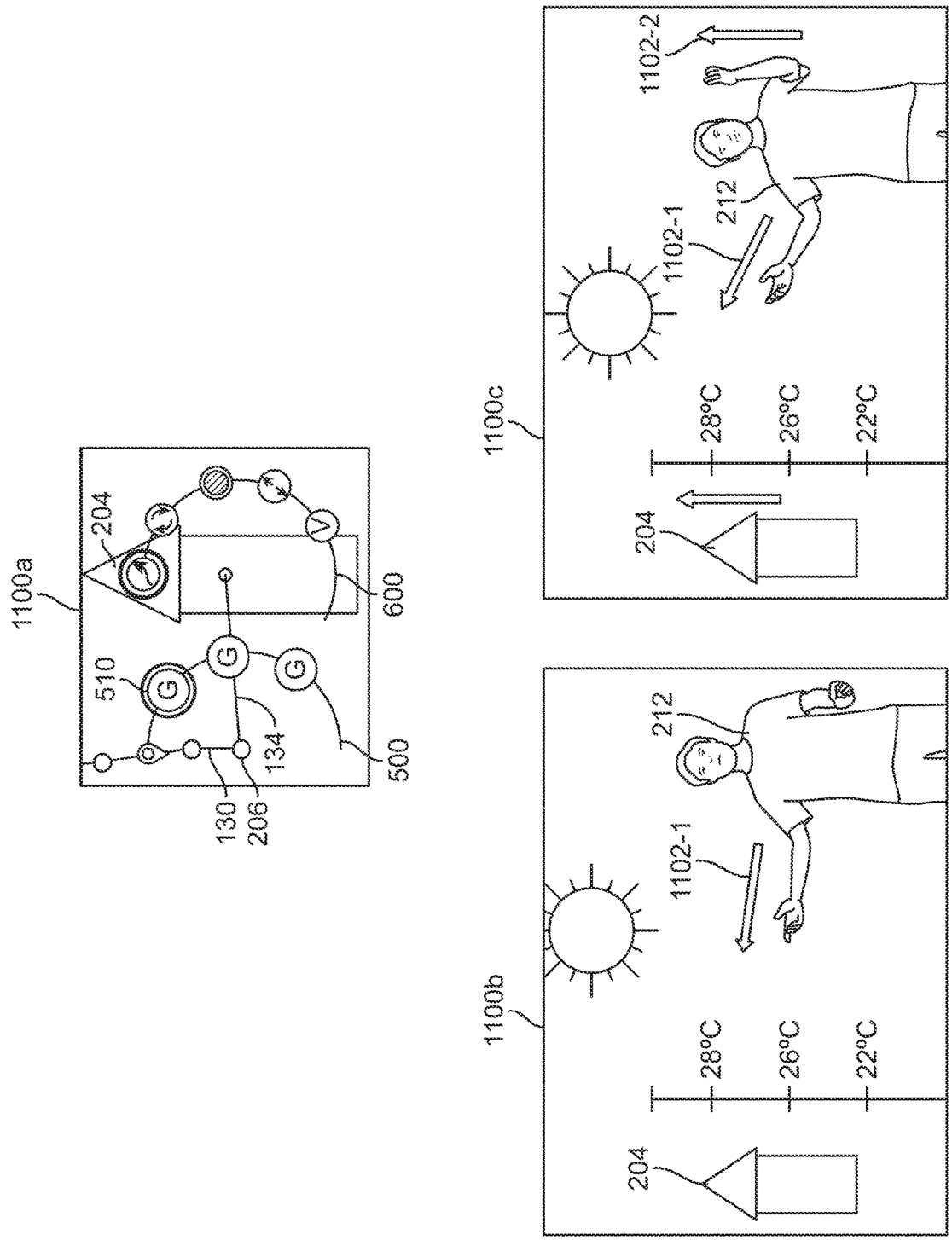
FIG. 11 depicts an example of triggering a graphic using a semaphoric gesture, according to certain aspects of this disclosure.

FIG. 11 depicts an example of modifying a graphic using pointing and a semaphoric gesture. In stage 1100a, a node 206 of a reference skeleton 130 is linked to a graphical element 204. For example, the user draws an edge 134 between the node 206 of the reference skeleton 130 and the graphical element 204 in the user interface. In the node menu 500, semaphoric gesture 504 is selected instead of location anchor 502. Pointing can be used to identify a graphical element to manipulate. In stage 1100b, the gesture engine 121 identifies that the person 212 is pointing at the graphical element 204, indicated by a first arrow 1102-1. The first arrow 1102-1 is not part of the modified scene, but is inserted in stage 1100b to show that the person 212 is pointing at the graphical element 204. As the person 212 points to the graphical element 204, the person 212 swipes his left hand up (a semaphoric gesture) to indicate that the graphical element 204 is to move up, stage 1100c. A second arrow 1102-2 shows a motion of the left hand of the person 212. The second arrow 1102-2 is not part of the modified scene, but inserted in stage 1100c to show that the person 202 is motioning upward. The graphical element 204 is incrementally moved based on the semaphoric gesture of the person 212, instead of being tied to an absolute position of the node 206. For example, the person 212 may swipe up three or four times to get the graphical element 204 to move from a bottom of the modified scene to a top of the modified scene. The person 212 can swipe down to have the graphical element 204 incrementally move downward. In another example, a swipe up by the person 212 can increase a size of the graphical element 204 if scale was selected as an output effect in the effects menu 600.

Example of Scaling

Figure 12:
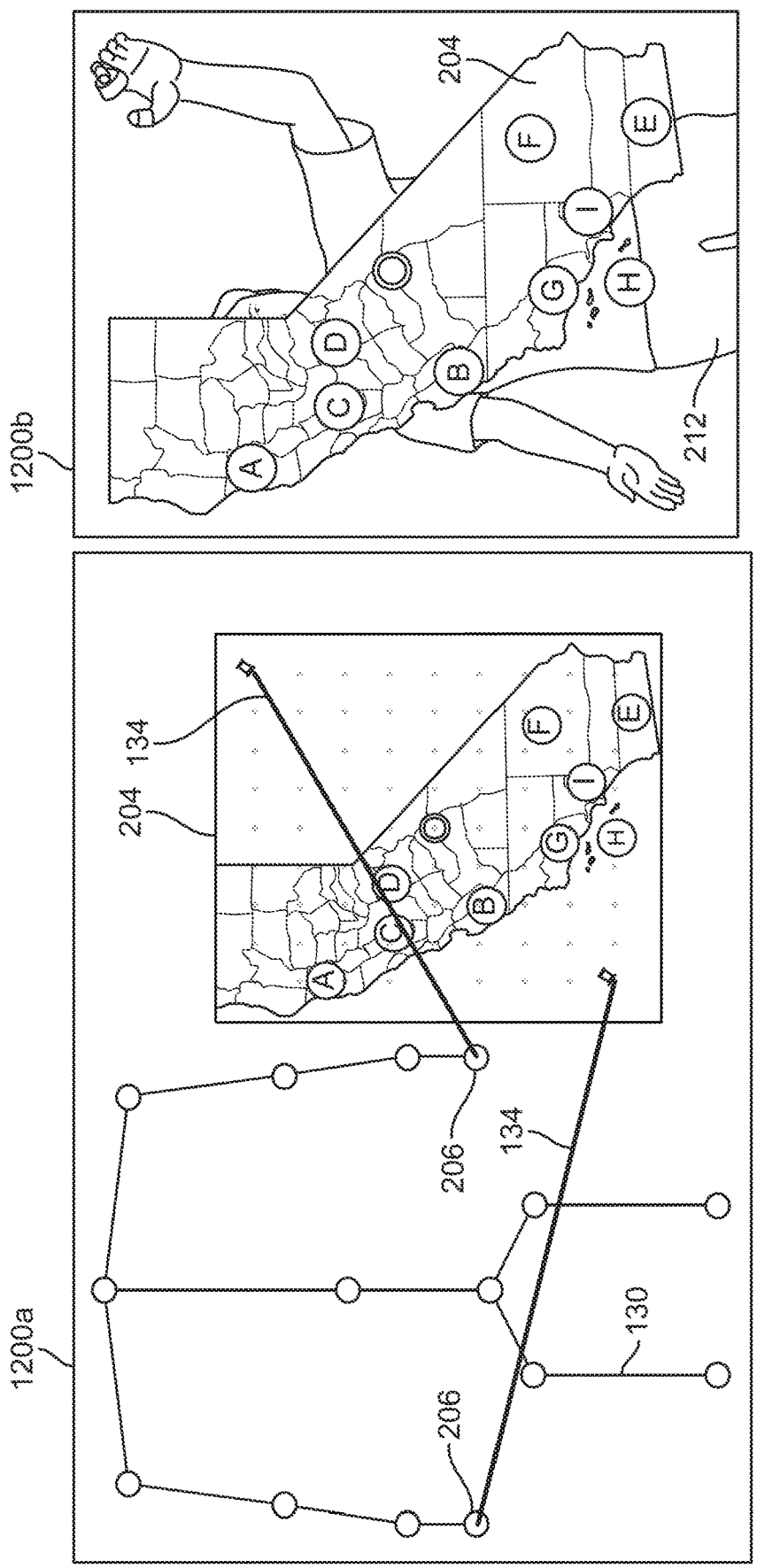
FIG. 12 depicts an example of direct manipulation with deformation (scaling a graphic using rigging), according to certain aspects of this disclosure.

FIG. 12 depicts an example of scaling a graphic using rigging. In stage 1200a, two nodes 206 of a reference skeleton 130 are linked to two corners of a graphical element 204. For example, the user draws an edge 134 between a node 206 of the reference skeleton 130, corresponding to a right hand of the reference skeleton 130, to a bottom left corner of the graphical element 204; and draws an edge 134 between a node 206 of the reference skeleton 130, corresponding to a left hand of the reference skeleton 130, to a top right corner of the graphical element 204, using the user interface. Video is acquired of a person 212 using a camera; and a motion sensor is used to generate a skeletal map of the person 212. The overlay engine overlays the graphical element 204 such that a bottom left corner of the graphical element 204 is near a right hand of the person 212 based on the skeletal map of the person 212; and a top right corner of the graphical element 204 is near a left hand of the person 212 based on the skeletal map of the person 212. As the overlay engine produces a modified scene by overlaying the graphical element 204 on the video, the graphical element 204 gets larger as the person separates his hands, and the graphical element 204 gets smaller as the person 212 brings his hands closer together, stage 1200b. Thus the overlay engine can receive from the user identification of links (e.g., edges 134) between two nodes of the reference skeleton 130 and two anchor points (e.g., pins, sometimes referred to as constrained handles) of the graphical element 204.

Example of Rigging

Figure 13:
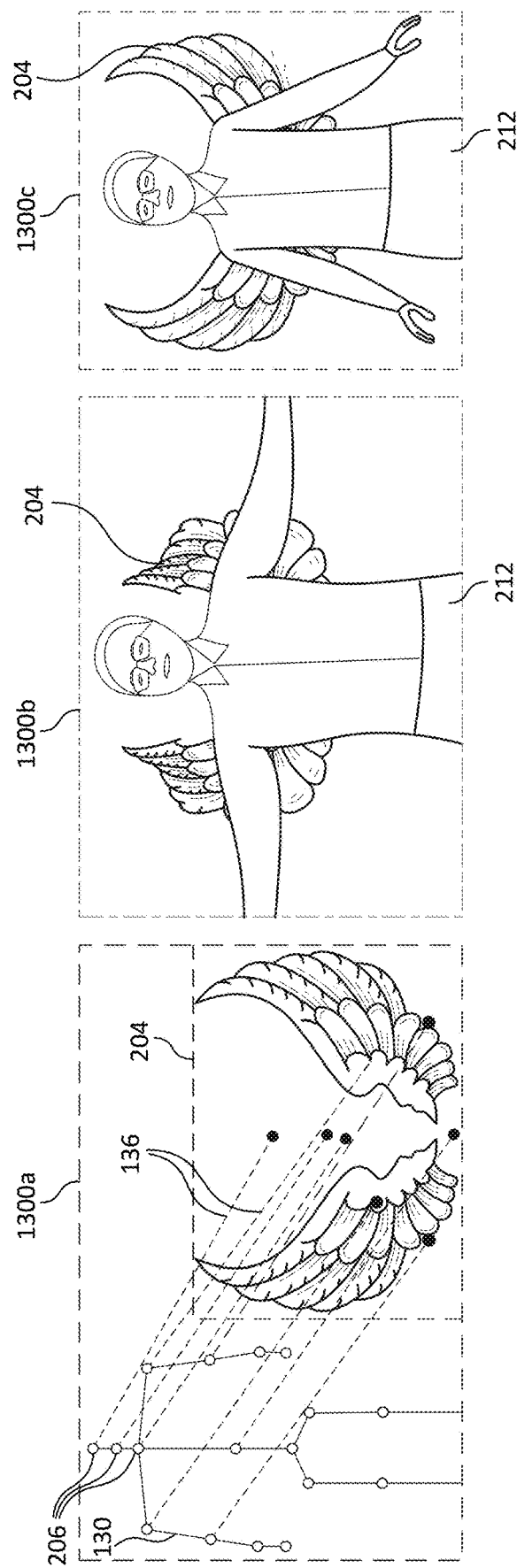
FIG. 13 depicts an example of deforming a graphic using rigging, according to certain aspects of this disclosure.

FIG. 13 depicts an example of deforming a graphic by rigging. A graphical element can be rigged to a reference skeleton by a user connecting a plurality of nodes of the reference skeleton to a plurality of pins of the graphical element. In some embodiments, a number of the plurality of nodes linked to pins on the graphical element is equal to or greater than two, three, four, five, six, seven, or eight. For example, in stage 1300a, eight nodes 206 are linked to eight anchor points of a graphical element 204. By linking three or more nodes 206 to three or more anchor points of a graphical element 204, the graphical element 204 can be deformed by movement of the person 212 (e.g., the overlay engine modifies the graphical element by changing relative spacing of anchor points, identified by the plurality of pins, on the graphical element in response to relative change in spacing between the plurality of nodes of the reference skeleton connected to the plurality of pins; other parts of the graphical element are deformed based on change of relative spacing between the anchoring points). Stage 1300b and stage 1300c show the person 212 moving his arms up and down, which deforms the graphical element 204.

Example of Triggering with Posture, Then Scaling a Graphical Element

Figure 14:
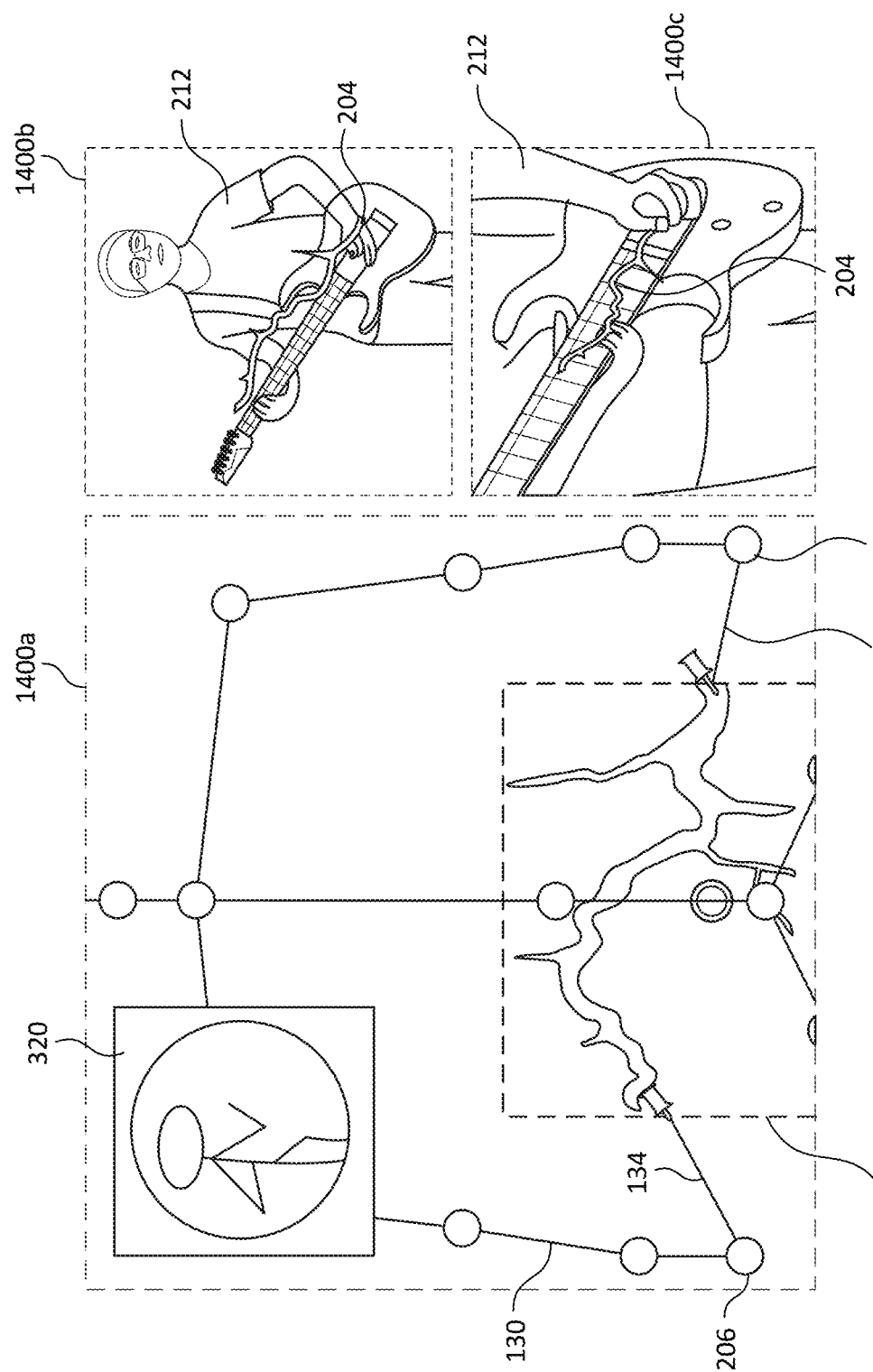
FIG. 14 depicts an example of using posture to trigger a graphic and then scaling the graphic using rigging, according to certain aspects of this disclosure.

FIG. 14 depicts an example of using posture to trigger a graphic, and then scaling the graphic using rigging. In stage 1400, a posture 320 is selected to trigger an overlay of graphical element 204. For example, the user selects posture 320 in the user interface. Graphical element 204 in FIG. 14 is a bolt of lightning. The posture 320 is of a person with hands apart as if holding a guitar. Nodes 206 of reference skeleton 130 corresponding to hands are linked to the graphical element 204 by edges 134. A camera is used to acquire video of a person 212; and a motion sensor is used to generate a skeletal map of the person 212 in the video. The skeletal map of the person 212 in the video is passed to the gesture engine. As the gesture engine determines that hands of the person 212 are spread apart as if holding a guitar, then the graphical element 204 is overlaid on the scene as part of the modified scene. As the person 212 moves his hands, the graphical element 204 is scaled, similarly as described in FIG. 12, so that it appears that the bolt of lightning of the graphical element 204 arcs from the hands of the person 212 in the modified scene, stage 1400b and stage 1400c.

Example Process of User-Defined Interactions With Virtual Objects

Figure 15:
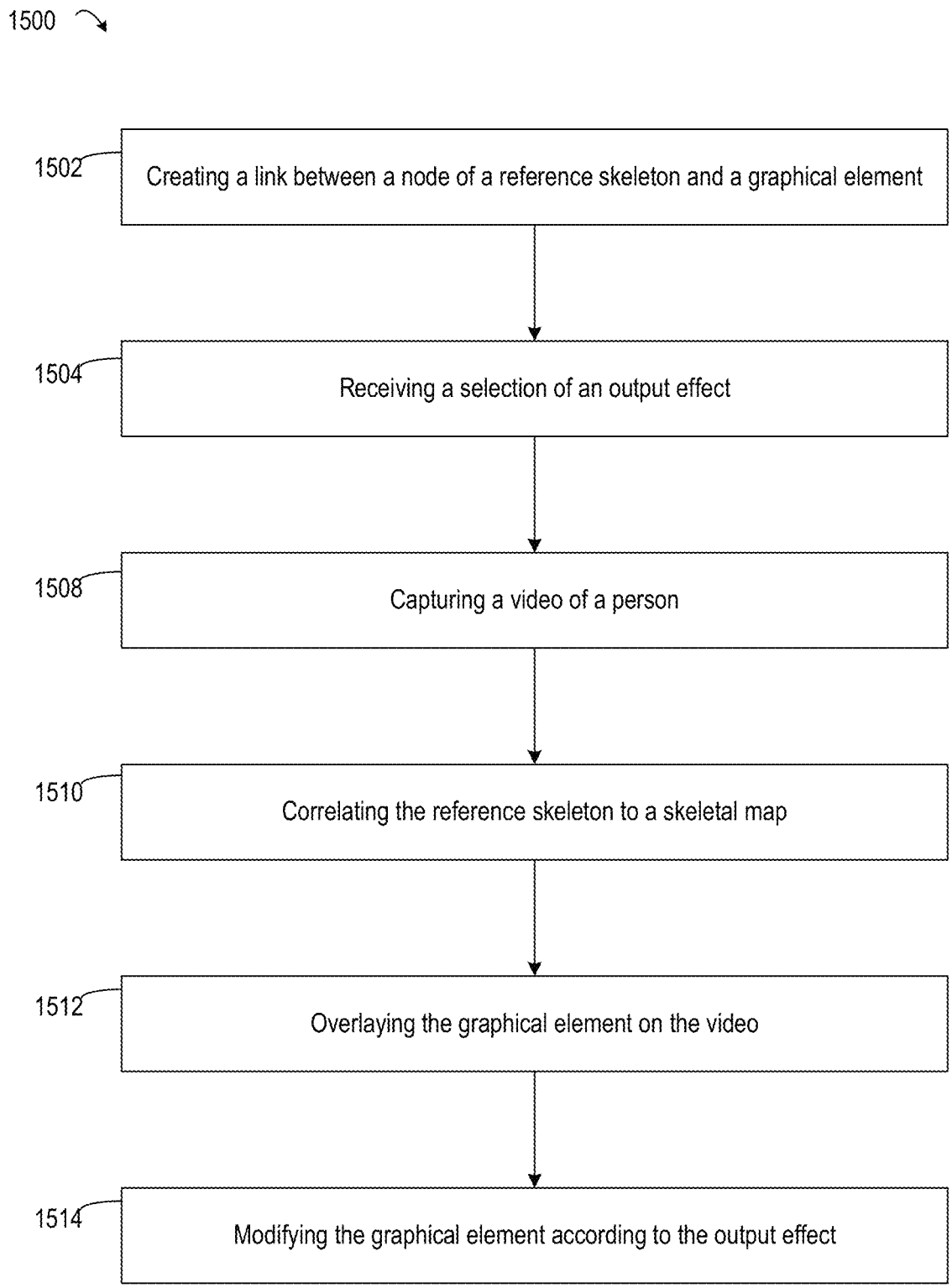
FIG. 15 depicts a flowchart of an embodiment of modifying a video with real-time graphical interactions, according to certain aspects of this disclosure.

FIG. 15 depicts a flowchart of an embodiment of a process 1500 of modifying a video with real-time graphical interactions. Process 1500 begins in step 1502 with creating a link between a node of a reference skeleton and a graphical element. For example, edge 134 creates a link between the reference skeleton 130 and the first graphical element 204-1 in FIG. 4. In step 1504, a selection of an output effect is received from a user. The output effect can be selected from a discrete set of output effects. For example, an output effect from the effects menu 600 in FIG. 6 is selected by the user.

A video of a person is captured, step 1504. For example, camera 104 in FIG. 1 captures a set of video frames 108a-n of scene 110. A skeletal map 112 is also generated, which can include maps 114a-n, as seen in FIG. 1. The skeletal map 112 can be generated by data from a motion sensor 106.

In step 1510, the reference skeleton is correlated to the skeletal map (e.g., so that points of the skeletal map correspond with nodes of the reference skeleton). The video is presented along with overlaying the graphical element on the video in a modified scene (e.g., modified scene 140 in FIG. 1), step 1512. In step 1514, the graphical element is modified according to the output effect selected and the link between the node of the reference skeleton and the graphical element, such that the graphical element is modified (e.g., by the overlay engine 124 in FIG. 1) based on body position or movement of the person in the video.

In some embodiments, a posture of the reference skeleton can be mapped to a trigger event, wherein trigger event begins to overlay the graphical element on the video (e.g., as described in conjunction with FIG. 14). Identifying the posture of the reference skeleton can be based on body position of the user in the video using a skeletal map.

In some embodiments, a dynamic gesture can be mapped to a trigger event, wherein the trigger event is to begin overlaying the graphical element (e.g., as described in conjunction with FIG. 10). The dynamic gesture can determine a position and relative size of the graphical element in the modified scene.

In some embodiments, links are created between three or more nodes of the reference skeleton and three or more anchor points of the graphical element. The graphical element can be modified (e.g., deformed) by changing relative spacing of the three or more anchor points in response to relative change in spacing between the three or more nodes of the reference skeleton (e.g., as described in conjunction with FIG. 13).

In some embodiments, modifying the graphical element is moving the graphical element within the modified scene. In some embodiments, moving the graphical element moves the graphical element on a defined path while overlaying the graphical element during presentation of the video.

In some embodiments, a first graphical element can be linked to a second graphical element (e.g., as described in FIGS. 8 and 9). In some embodiments, the reference skeleton 130 in FIG. 3 can represent something other than a person. For example, there could be a reference skeleton for an animal (e.g., dog, cat, horse, and hamster) or other object (e.g., car, bicycle, and swing).

Example of a Computing System for Implementing Certain Aspects

Figure 16:
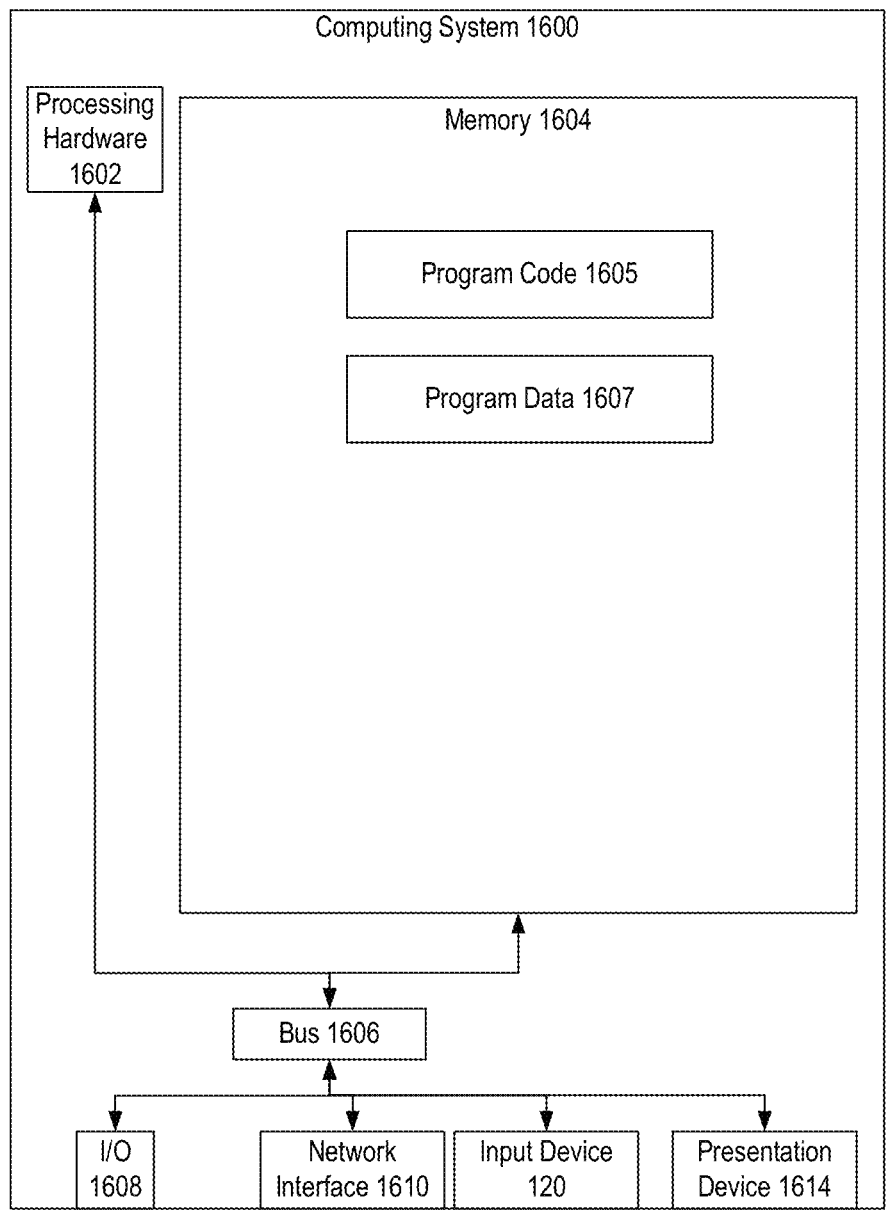
FIG. 16 depicts an example of a computing system for implementing one or more aspects of this disclosure.

A suitable computing system or group of computing systems can be used for performing the operations described herein. For example, FIG. 16 depicts an example of a computing system 1600. In some aspects, the computing system 1600 includes processing hardware 1602 that executes program code 1605 (e.g., the video editor 102), a memory device 1604 that stores one or more sets of program data 1607 computed or used by operations in the program code 1605 (e.g., a set of input video frames, annotations identifying target regions, motion fields, a set of edited video frames, etc.), one or more input devices 120, and one or more presentation devices 1614 for displaying graphical content generated by executing the program code 1605. For illustrative purposes, FIG. 16 depicts a single computing system on which the program code 1605 is executed, the program data 1607 is stored, and the input devices 120 and presentation device 1614 are present. But various applications, datasets, and devices described can be stored or included across different computing systems having devices similar to the devices depicted in FIG. 16.

The depicted example of a computing system 1600 includes processing hardware 1602 communicatively coupled to one or more memory devices 1604. The processing hardware 1602 executes computer-executable program code stored in a memory device 1604, accesses information stored in the memory device 1604, or both. Examples of the processing hardware 1602 include a microprocessor, an application-specific integrated circuit ("ASIC"), a field-programmable gate array ("FPGA"), or any other suitable processing device. The processing hardware 1602 can include any number of processing devices, including a single processing device.

The memory device 1604 includes any suitable non-transitory computer-readable medium for storing data, program code, or both. A computer-readable medium can include any electronic, optical, magnetic, or other storage device capable of providing a processor with computer-readable instructions or other program code 1605. Non-limiting examples of a computer-readable medium include a magnetic disk, a memory chip, a ROM, a RAM, an ASIC, optical storage, magnetic tape or other magnetic storage, or any other medium from which a processing device can read instructions. The program code 1605 may include processor-specific instructions generated by a compiler or an interpreter from code written in any suitable computer-programming language, including, for example, C, C++, C#, Visual Basic, Java, Python, Perl, JavaScript, and ActionScript.

The computing system 1600 may also include a number of external or internal devices, such as an input device 120, a presentation device 1614, or other input or output devices. For example, the computing system 1600 is shown with one or more input/output ("I/O") interfaces 1608. An I/O interface 1608 can receive input from input devices 120 or provide output to output devices. One or more buses 1606 are also included in the computing system 1600. The bus 1606 communicatively couples one or more components of a respective one of the computing system 1600.

The computing system 1600 executes program code 1605 that configures the processing hardware 1602 to perform one or more of the operations described herein. The program code 1605 includes, for example, the video editor 102 or other suitable program code that performs one or more operations described herein. The program code 1605 may be resident in the memory device 1604 or any suitable computer-readable medium and may be executed by the processing hardware 1602 or any other suitable processor. The program code 1605 uses or generates program data 1607. Examples of the program data 1607 include one or more of the memory frames, ground truth frames, feature-classification data, feature-selection data, key or value maps, etc. described herein with respect to FIGS. 1-7.

In some aspects, the computing system 1600 also includes a network interface device 1610. The network interface device 1610 includes any device or group of devices suitable for establishing a wired or wireless data connection to one or more data networks. Non-limiting examples of the network interface device 1610 include an Ethernet network adapter, a modem, and/or the like. The computing system 1600 is able to communicate with one or more other computing devices via a data network using the network interface device 1610.

An input device 120 can include any device or group of devices suitable for receiving visual, auditory, or other suitable input that controls or affects the operations of the processing hardware 1602. Non-limiting examples of the input device 120 include a recording device, a touchscreen, a mouse, a keyboard, a microphone, a video camera, a separate mobile computing device, etc. A presentation device 1614 can include any device or group of devices suitable for providing visual, auditory, or other suitable sensory output. Non-limiting examples of the presentation device 1614 include a touchscreen, a monitor, a separate mobile computing device, etc.

Although FIG. 16 depicts the input device 120 and the presentation device 1614 as being local to the computing device that executes the program code 1605, other implementations are possible. For instance, in some aspects, one or more of the input device 120 and the presentation device 1614 can include a remote client-computing device that communicates with the computing system 1600 via the network interface device 1610 using one or more data networks described herein.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A system for real-time graphics interactions with user motions, the system comprising:
   a motion-sensing device configured to track body position of a user to obtain a skeletal map of the user;
   a camera configured to obtain a video of the user;
   a screen; and
   a memory device containing instructions that, when executed, cause one or more processors to perform the following steps:
      creating one or more links between one or more nodes of a reference skeleton and a graphical element, wherein:
         the reference skeleton is in a shape of a human body; and
         the one or more links are defined by the user;
      receiving from the user a selection of an output effect from a discrete set of output effects, wherein the output effect is not the same as the graphical element;
      capturing the video of the user, using the camera, after creating the one or more links between the one or more nodes of the reference skeleton and the graphical element, and after receiving the selection of the output effect, wherein the video depicts the user;
      correlating the reference skeleton to the skeletal map of the body position of the user in the video, so that nodes of the reference skeleton correspond to points of the skeletal map;
      presenting the video on the screen;
      presenting the graphical element on the screen as an overlay of the video; and
      modifying the graphical element, as overlaid on the video, according to the output effect and the link between the node of the reference skeleton and the graphical element.

2. The system of claim 1, wherein the memory device further contains instruction that, when executed, cause the one or more processors to perform the following steps:
   mapping a posture of the reference skeleton to a trigger event, wherein the trigger event is overlaying the graphical element on the video;
   identifying the posture of the reference skeleton based on body position of the user in the video; and
   overlaying the graphical element on the video based on identifying the posture of the reference skeleton.

3. The system of claim 1, wherein the memory device further contains instructions that, when executed, cause the one or more processors to perform the following steps:
   mapping a dynamic gesture to a trigger event, wherein the trigger event is overlaying the graphical element on the video;
   identifying the dynamic gesture in the video based on movement of the reference skeleton;
   determining a position and relative size of the dynamic gesture;
   overlaying the graphical element on the video at the position; and
   sizing the graphical element according to the relative size of the dynamic gesture.

4. The system of claim 1, wherein the memory device further contains instructions that, when executed, cause the one or more processors to perform the following steps:
   creating links between three or more nodes of the reference skeleton and three or more anchor points of the graphical element; and
   modifying the graphical element by changing relative spacing of the three or more anchor points in response to relative change in spacing between the three or more nodes of the reference skeleton.

5. The system of claim 1, wherein the discrete set of output effects comprises two or more output effects selected from the group consisting of: translation, rotation, change in opacity, change in scale, deformation, and change in speed.

6. The system of claim 1, wherein the memory device further contains instructions that, when executed, cause the one or more processors to perform the following steps:
   determining that the user is pointing to the graphical element based on positions of nodes of the reference skeleton; and
   selecting the graphical element for modification based on determining that the user is pointing to the graphical element.

7. The system of claim 1, wherein the memory device further contains instructions that, when executed, cause the one or more processors to incrementally modify the graphical element based on a dynamic semaphoric gesture of the reference skeleton.

8. The system of claim 1, wherein the output effect is a translation of the graphical element, and the memory device further contains instructions that, when executed, cause the one or more processors to perform the following steps:
   receiving a defined path from the user, and
   constraining translation of the graphical element to the defined path while overlaying the graphical element during presenting of the video.

9. The system of claim 1, wherein:
   the output effect is a first output effect;
   the graphical element is a first graphical element; and
   the memory device further contains instructions that, when executed, cause the one or more processors to perform the following steps:
      creating a link between the first graphical element and a second graphical element, wherein the link between the first graphical element and the second graphical element is defined by the user;
      receiving from the user a selection of a second output effect from the discrete set of output effects; and
      overlaying the second graphical element on the video according to the second output effect and the link between the first graphical element and the second graphical element while presenting the video, such that as the first graphical element is modified, the second graphical element is also modified.

10. The system of claim 1, wherein the memory device further contains instructions that, when executed, cause the one or more processors to overlay the graphical element on the video no more than two seconds after capturing the video.

11. A method for user-defined interactions with virtual objects, the method comprising:
creating a link between a node of a reference skeleton and a graphical element, wherein:
the reference skeleton is in a shape of a human body; and
the link is defined by a user;
receiving from the user a selection of an output effect from a discrete set of output effects, wherein the output effect is not the same as the graphical element;
capturing a video of the user that depicts the user, after creating the link between the node of the reference skeleton and the graphical element;
correlating the reference skeleton to a skeletal map of the body position of the user in the video, so that nodes of the reference skeleton correspond to points of the skeletal map;
presenting the video;
overlaying the graphical element on the video; and
modifying the graphical element, as overlaid on the video, according to the output effect and the link between the node of the reference skeleton and the graphical element.

12. The method of claim 11, further comprising:
mapping a posture of the reference skeleton to a trigger event, wherein the trigger event is overlaying the graphical element on the video;
identifying the posture of the reference skeleton based on body position of the user in the video; and
overlaying the graphical element on the video based on identifying the posture of the reference skeleton.

13. The method of claim 11, further comprising:
mapping a dynamic gesture to a trigger event, wherein the trigger event is overlaying the graphical element on the video;
identifying the dynamic gesture in the video based on movement of the reference skeleton;
determining a position and relative size of the dynamic gesture;
overlaying the graphical element on the video at the position; and
sizing the graphical element according to the relative size of the dynamic gesture.

14. The method of claim 11, further comprising:
creating links between three or more nodes of the reference skeleton and three or more anchor points of the graphical element; and
modifying the graphical element by changing relative spacing of the three or more anchor points in response to relative change in spacing between the three or more nodes of the reference skeleton.

15. The method of claim 11, wherein the discrete set of output effects comprises two or more output effects selected from the group consisting of: translation, rotation, change in opacity, change in scale, deformation, and change in speed.

16. A non-transitory computer-readable medium comprising instructions that, when executed, cause one or more processors to perform the following steps:
creating a link between a node of a reference skeleton and a graphical element, wherein:
the reference skeleton is in a shape of a human body; and
the link is defined by a user;
receiving from the user a selection of an output effect from a discrete set of output effects, wherein the output effect is not the same as the graphical element;
capturing a video of the user that depicts the user, after creating the link between the node of the reference skeleton and the graphical element;
correlating the reference skeleton to a skeletal map of the body position of the user in the video, so that nodes of the reference skeleton correspond to points of the skeletal map;
presenting the video;
overlaying the graphical element on the video; and
modifying the graphical element, as overlaid on the video, according to the output effect and the link between the node of the reference skeleton and the graphical element.

17. The non-transitory computer-readable medium of claim 16, wherein the instructions, when executed, further cause the one or more processors to perform the following steps:
determining that the user is pointing to the graphical element based on positions of nodes of the reference skeleton; and
selecting the graphical element for modification based on determining that the user is pointing to the graphical element.

18. The non-transitory computer-readable medium of claim 16, wherein the instructions, when executed, further cause the one or more processors to incrementally modify the graphical element based on a dynamic semaphoric gesture of the reference skeleton.

19. The non-transitory computer-readable medium of claim 16, wherein the output effect is a translation of the graphical element, and the instructions, when executed, further cause the one or more processors to perform the following steps:
receiving a defined path from the user, and
constraining translation of the graphical element to the defined path while overlaying the graphical element during presenting of the video.

20. The non-transitory computer-readable medium of claim 16, wherein:
the output effect is a first output effect;
the graphical element is a first graphical element; and
the instructions, when executed, further cause the one or more processors to perform the following steps:
creating a link between the first graphical element and a second graphical element;
receiving from the user a selection of a second output effect from the discrete set of output effects; and
overlaying the second graphical element on the video according to the second output effect and the link between the first graphical element and the second graphical element while presenting the video, such that as the first graphical element is modified, the second graphical element is also modified.

* * * * *